US009286364B2

(12) United States Patent
Kuruganti et al.

(10) Patent No.: US 9,286,364 B2
(45) Date of Patent: *Mar. 15, 2016

(54) METHODS AND SYSTEMS FOR SHARING INFORMATION IN A SUPPLY CHAIN

(75) Inventors: Aditya S. Kuruganti, San Francisco, CA (US); Kedar Doshi, Palo Alto, CA (US); Chaitanya Bhatt, Union City, CA (US); William Moxley, San Francisco, CA (US)

(73) Assignee: salesforce.com inc., San Francisco, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 12/693,374

(22) Filed: Jan. 25, 2010

(65) Prior Publication Data
US 2010/0235322 A1 Sep. 16, 2010

Related U.S. Application Data

(60) Provisional application No. 61/146,968, filed on Jan. 23, 2009.

(51) Int. Cl.
G06F 7/00 (2006.01)
G06F 17/00 (2006.01)
G06F 17/30 (2006.01)

(52) U.S. Cl.
CPC .............................. *G06F 17/30575* (2013.01)

(58) Field of Classification Search
None
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |

(Continued)

OTHER PUBLICATIONS

Final Office Action from U.S. Appl. No. 12/145,325, dated Sep. 27, 2012.
Notice of Allowance from U.S. Appl. No. 12/145,325, dated Jul. 1, 2013.
Non-Final Office Action from U.S. Appl. No. 12/145,325, dated Mar. 15, 2012.
Final Office Action from U.S. Appl. No. 12/145,325, dated Jun. 2, 2011.
Non-Final Office Action from U.S. Appl. No. 12/145,325, dated Nov. 24, 2010.

*Primary Examiner* — Usmaan Saeed
*Assistant Examiner* — Michele Choi

(57) ABSTRACT

Method and systems for sharing product data involved in a supply chain among a plurality of subscribers to an on-demand database is described. Data related to a product is received from a first subscriber and stored into a first section of the on-demand database reserved for the first subscriber. The first subscriber then communicates a request to share the product data with one or more second subscribers. Once the first subscriber receives an acceptance from the one or more second subscribers, the product data is stored in a second section of the on-demand database reserved for the second subscriber. Changes made to the data associated with the product are synchronized between the two subscribers.

4 Claims, 20 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,047,276 B2 | 5/2006 | Liu et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,221,942 B2 | 5/2007 | Jung et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,108 B2 | 5/2008 | Vidaillac |
| 7,401,094 B1 | 7/2008 | Kesler |
| 7,412,455 B2 | 8/2008 | Dillon |
| 7,508,789 B2 | 3/2009 | Chan |
| 7,590,564 B1 | 9/2009 | Ward et al. |
| 7,620,655 B2 | 11/2009 | Larsson et al. |
| 7,630,986 B1 | 12/2009 | Herz et al. |
| 7,664,861 B2 | 2/2010 | Guntupalli et al. |
| 7,698,160 B2 | 4/2010 | Beaven et al. |
| 7,707,222 B2 | 4/2010 | Manno |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0055880 A1 | 3/2003 | Liu et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0230676 A1* | 11/2004 | Spivack et al. ............... 709/223 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0015466 A1* | 1/2005 | Tripp ........................... 709/219 |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0132221 A1 | 6/2005 | Marcjan |
| 2005/0210500 A1 | 9/2005 | Stone |
| 2005/0215252 A1 | 9/2005 | Jung et al. |
| 2005/0223022 A1* | 10/2005 | Weissman et al. ............ 707/102 |
| 2005/0283478 A1 | 12/2005 | Choi et al. |
| 2006/0021019 A1 | 1/2006 | Hinton et al. |
| 2006/0168043 A1 | 7/2006 | Eisenberger et al. |
| 2006/0206834 A1 | 9/2006 | Fisher et al. |
| 2007/0168958 A1 | 7/2007 | Huang et al. |
| 2008/0244184 A1 | 10/2008 | Lewis et al. |
| 2008/0249972 A1 | 10/2008 | Dillon |
| 2008/0292080 A1* | 11/2008 | Quon et al. ............... 379/201.02 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

(56) References Cited

U.S. PATENT DOCUMENTS

| | | |
|---|---|---|
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

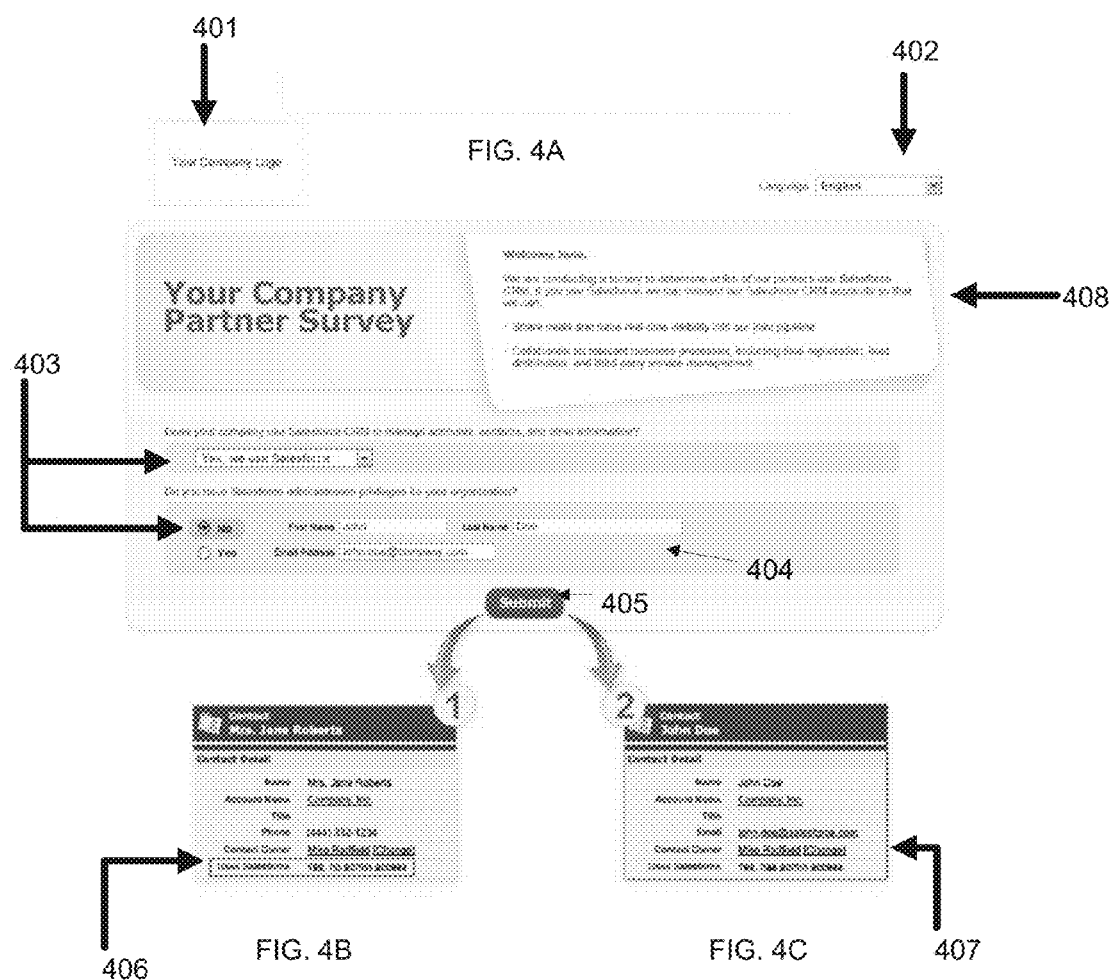

METHODS AND SYSTEMS FOR SHARING INFORMATION IN A SUPPLY CHAIN

CLAIM OF PRIORITY

The present application claims priority from and is a nonprovisional application of U.S. Provisional Application No. 61/146,968, entitled "Methods and Systems for Sharing Product Data in a Supply Chain" filed Jan. 23, 2009, the entire contents of which are herein incorporated by reference for all purposes.

CROSS-REFERENCES TO RELATED APPLICATIONS

This application is related to commonly owned U.S. patent application Ser. No. 12/145,325 entitled "Method and System For Sharing Data Between Subscribers of a Multi-Tenant Database Service" by Doshi et. al., filed Jun. 24, 2008, and provisional U.S. Patent Application No. 61/096,289 entitled "Automating Sharing Data Between Subscribers Of A Multi-Tenant Database Service" by Doshi et. al., filed Sep. 11, 2008, the disclosures of which are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to sharing data among business partners, and more particularly to sharing data in supply chain partners via a multi-tenant database service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional supply chain operation, the different business partners communicate via e-mail, fax, or phone call. One of the business partners may run a particular application on its own database system to which the other entities log onto and enter data by hand. The different business partners also enter data into their own database systems. This process is cumbersome, time-consuming, and tends to cause inaccuracies.

Accordingly, it is desirable to provide systems and methods that allow companies to easily share information, e.g. in a supply chain.

BRIEF SUMMARY

In accordance with embodiments, there are provided mechanisms and methods for sharing product data among business partners in a supply chain via a multi-tenant database service. These mechanisms and methods for sharing product data or other information can enable business partners to receive real-time and automatic updates to an order, an offer, product, or other object or part of a supply chain. A tenant (also called a subscriber or organization) of the multi-tenant database system can store data specific to that tenant in the multi-tenant data base system. Data associated with a product can be shared between different subscribers, who are or potentially will become business partners. The ability of embodiments to share data can enable partners to share deals and create new business opportunities. Embodiments can allow organizations to effectively prepare and educate employees, partners, and users around new features in each product release.

In an embodiment and by way of example, a method of sharing product data involved in a supply chain among a plurality of subscribers to an on-demand database is provided. Data related to a product is received from a first of the subscribers. From the data, a product object is created in a section of the on-demand data base that is accessibly restricted to the first subscriber. A request to share the product object is communicated to one or more second subscribers. An acceptance of a second subscriber is received. Data associated with the product object is received in a section of the on-demand data base that is reserved for the second subscriber. Changes made to the product object are synchronized between the two subscribers.

In another embodiment and by way of example, a system that implements the method of sharing product data involved in a supply chain among a plurality of subscribers to an on-demand database is provided. The system includes one or more processors which send, receive and store data associated with a product object in an on demand database after a request is sent from a first subscriber to a second subscriber. The request is accepted by the second subscriber before the shared product object data is stored in the on-demand database in a location accessible by both the first and second subscriber. In addition, the shared product object data is synchronized between the two subscribers.

In another embodiment and by way of example, a computer program product stored on a tangible computer readable medium storing a plurality of instructions for controlling one or more processors of an on-demand database system to perform an operation for sharing product data in a supply chain among a plurality of subscribers is provided. The computer program product includes instructions to receive a data related to a product by a first subscriber, communicate a request to share the product object with one or more second subscribers, accept an invitation form the second subscriber, store data associated with the shared product object on the on demand database and synchronous the data between the two subscribers.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

While the present invention is described with reference to an embodiment in which techniques for methods and systems for sharing information in a supply chain are implemented in a system having an application server providing a front end for an on-demand database service capable of supporting multiple tenants, the present invention is not limited to multitenant databases nor deployment on application servers. Embodiments may be practiced using other database architectures, i.e., ORACLE®, DB2®, by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIGS. 4A-4C illustrate application flows for sending a survey to a partner in an on-demand database according to an embodiment.

FIG. 6 illustrates an exemplary screenshot of connection detail according to an embodiment.

FIG. 9A-9C illustrates an application flow for subscribing to objects according to an embodiment.

DETAILED DESCRIPTION

Embodiments of the present invention can provide business collaboration both within and across organizations. Users can share leads, opportunities, cases and other information with their business partners and get real-time updates on the shared data. Embodiments may use proprietary connectivity or standards based connectivity (e.g. XML, W3C)

Various embodiments can enable a user of a database system to share opportunity products on opportunities, define templates that ease the process of connecting with companies, allow users to share the same record with multiple partners, and add certain API functions that will allow users to create custom rules to forward and stop sharing records with connections.

General Overview

Systems and methods are provided for sharing information in a supply chain. These techniques for sharing information in a supply chain can enable embodiments to provide efficiently and accurately communicate information about one or more business transactions among multiple businesses.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers.

Next, mechanisms and methods for providing controlling access to custom objects in a database system will be described with reference to example embodiments.

System Overview

Figure 1A:
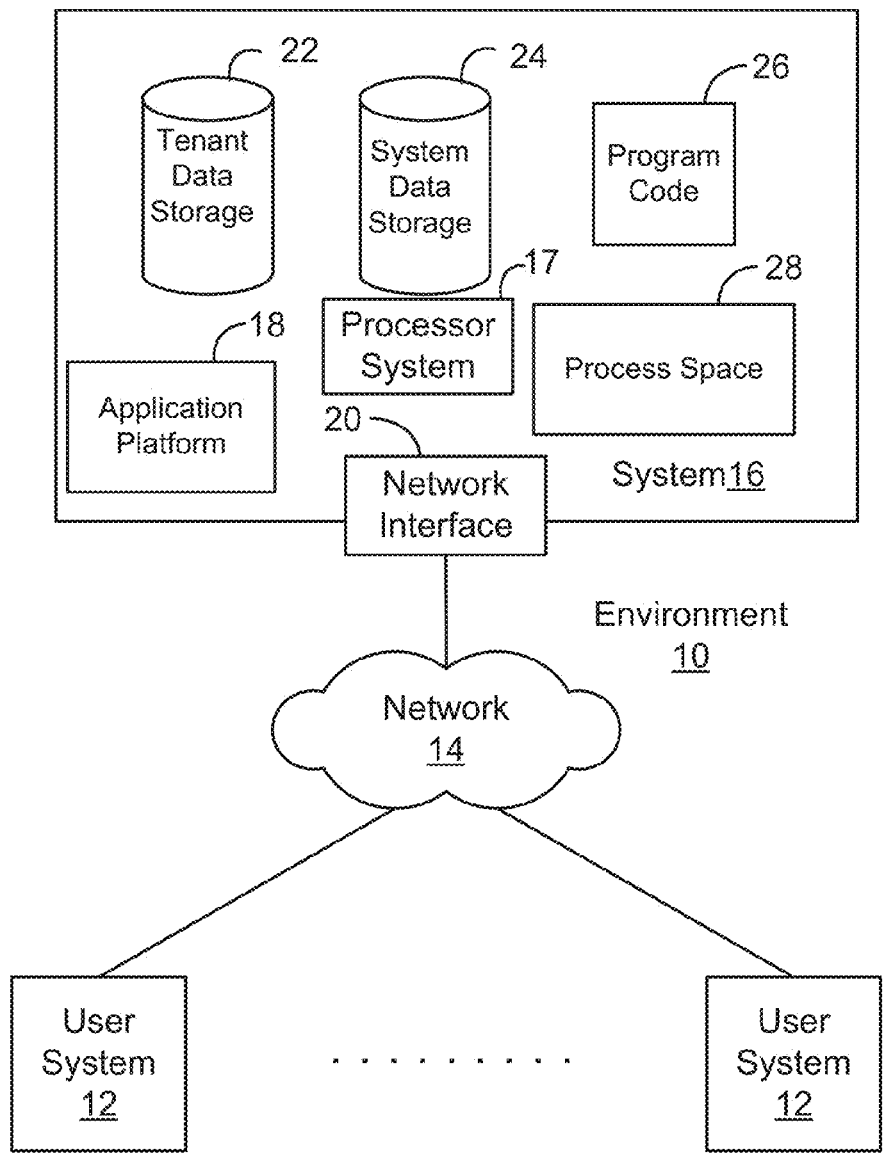
FIGS. 1A and 1B illustrate a block diagram of an environment wherein an on-demand database service might be used and various possible interconnections between these elements according to an embodiment.

FIG. 1A illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1A, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1A, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 1B:
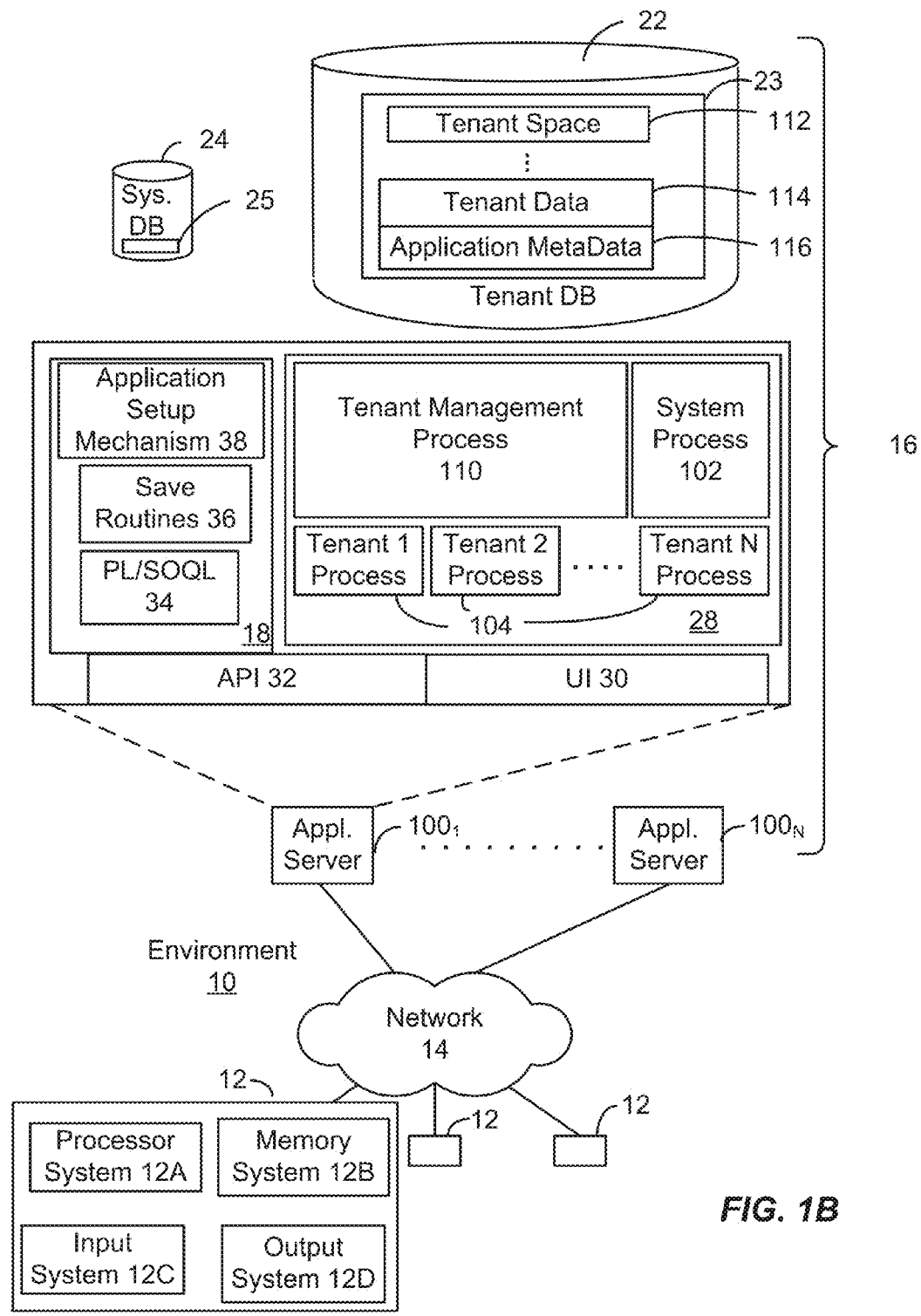

FIG. 1B also illustrates environment 10. However, in FIG. 1B elements of system 16 and various interconnections in an embodiment are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Set-up and Sharing of Data Between Tenants

Figure 2:
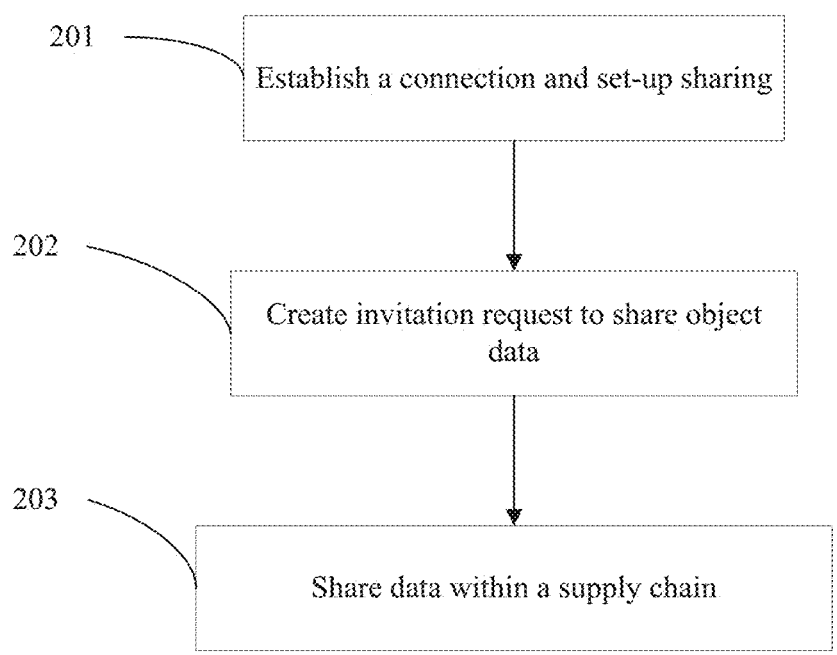
FIG. 2 illustrates a flow diagram of a method for sharing data in a supply chain in an on-demand database according to an embodiment.

FIG. 2 provides a flow diagram of method 200 of how data related to a product is shared among different companies in a supply chain according to embodiments of the present invention. A user can initially set up a database system to allow such sharing. For example, the information stored by one tenant may be made available to another tenant. In one aspect, the tenancy within the database is established between partners prior to sharing.

In step 201, a user may set up their database in order to establish a connection with a contact, or partner. Initial set-up may include enabling sharing capabilities, establishing tenancy within the database and inviting a contact to create a connection. A user may communicate with the a contact in order to create such a connection through an email invitation in the form of a survey. A connection is created between a user and a contact when the contact acknowledges use of the database and, in some embodiments, their permissions to share data with other partners in database.

In step 202, the user may invite a connection to share data objects within their database. The user may customize templates in order to create an invitation. The customization may also include selected fields relating to that object which are going to be shared with a connection. The invitation templates may be applied to multiple connections or individually customized per each connection. The connection needs to accept the invitation prior to sharing the data offered.

When the invitation is accepted, the structure of how an object and fields related to that shared object is defined within the connection's database. For example, the object is mapped to an object and the fields are mapped to corresponding fields in that object. The connection will then have an object and fields within their database matching those shared by the user. If new fields are added at a later point, this structure is updated in the connection's system. Accordingly, when the record is shared with a connection, the record is correctly mapped to a connections' database based on the object mapping.

In step 203, the user may share data with a connection. The shared data records may be modified after they are shared. In addition, new records may be shared with a connection upon invitation and by a user publishing and subscribing to additional records which are available for sharing. The data shared may be in the form of object data, such as products, opportunities, leads, etc. In the case of the aforementioned objects, the shared data record is made available to partners within a supply chain allowing for an improved business relationship and development.

The aforementioned method for sharing data between database users is discussed in further detail in the following sections.

Initial Set-Up

In some embodiments, in order to begin a sharing process between different tenants of a multi-tenant database, an initial connection can be established. In one embodiment, the connection may only be established if both tenants are both subscribers to a same database system (e.g., system 16).

Figure 3:
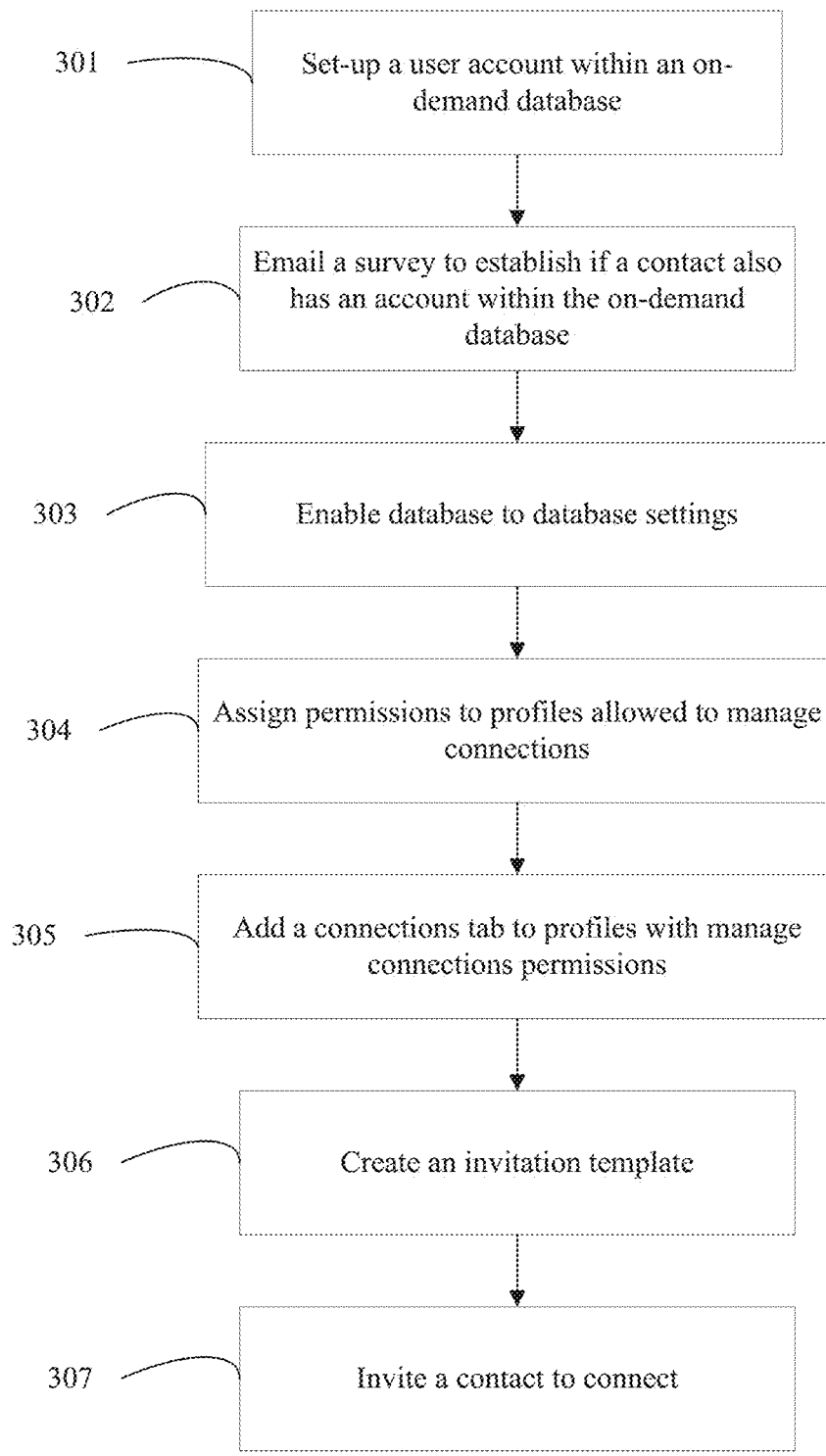
FIG. 3 is a flowchart illustrating a method for initial setup in an on-demand database according to an embodiment.

FIG. 3 provides a flow diagram of a method 300 of establishing a connection of a first organization (subscriber) with another subscriber of the database system according to embodiments of the present invention. Method 300 can discover which partners may be a tenant in a multi-tenant database, enable settings and configurations, and invite a connection. Herein, a connection is the establishment of an ability to share information between the two subscribers of the multi-tenant database system. In one embodiment, method 300 can be used to implement step 201 of method 200.

In step 301, a user of the first organization establishes a user account and logs into the system. The user may be an administrator or another user of the system that has access to that particular tenant's information, dependent on the permissions established by the administrator. Such permission are discussed in more detail in the permissions section of the disclosure.

Within a database of an embodiment, many users may be allowed to access records within one tenant location. For instance, a salesclerk in a retail location may have access to the retail owner's account within the database. However, the owner may only wish the salesclerk to have specific privileges, or permissions within the system. In one embodiment, in order to establish a connection with a partner organization, the user has administrative privileges. In addition, in order to modify email templates and settings within the system, the user also has these administrative privileges. Accordingly, such privileges, or permissions can be established for each type of user profile in a tenancy in order for certain records to be viewed and for modifications to those records to be made.

In step 302, the user determines whether a connection with a business partner is possible. In one embodiment, the user requests the database system to send an e-mail to the business partner. The e-mail can require a response that is used to determine whether the business partner is a subscriber.

The user can customize the e-mail through an e-mail template, such as with a company logo or slogan. An end user that is using the template can further tailor the e-mail to the specific partner. The electronic message may include a welcome message and explanation as to the purpose of the email, as well as fields, radio buttons and other data elements for the receiving party to select as part of the response. For example, the fields provided may ask whether the receiving party utilized the database and what types of permissions they have to within their organization. The customized email may then be sent to the contact at a partner organization.

Essentially, the e-mail provides a survey of the companies available on the database to the user. The survey information is collected when the receiving party provides answers to the questions provided. The information provided may then be automatically stored within the database in records relating to the user's partners, which have been entered into the database previously. Accordingly, if a partner responds to the email survey providing they are a tenant within the database, such information is noted in the user's database under that particular partner's record as a part of the partner's contact information. In addition, the administrative privileges, or permissions allowed to party receiving the email is also noted in the partner's record.

FIG. 4A illustrates an exemplary screenshot of a customized email that may be received by a partner in the database. As shown, the email includes a welcome message 408 the user's customized logo 401 and fields 403, with drop down lists and radio buttons, to answer the survey questions. In some embodiments, a language selection field 402 may be provided in order to facilitate the needs of the receiving party. If the receiving party, or partner contact, is a tenant within the database and does not have administrative privileges within the organization, they may additionally provide contact information 404 for an administrator or user with higher permissions. The contact information may be manually entered into additional fields provided on the survey.

Once the survey is complete, the partner contacted may submit 405 the information through the click of a button. The information is automatically received by the user of the database and entered into the partner's contact record within their database. As shown in FIG. 4C, if a new contact is provided in the response to the survey 404, this information may be automatically entered to create a new contact on the database under that partner's record. Each contact, both the originally emailed contact, FIG. 4B, and the newly established contact, FIG. 4C, have indications on their contact records of privileges and database usage, 406, 407. Accordingly, the database tenant to tenant connection is established and sharing between the two tenants may be enabled.

Referring back to FIG. 3, in step 303, to enable sharing between tenants, each tenant individually enables the sharing settings of the database. A reminder message may also be included in the initial email survey sent to the user's partner to perform this step. In some embodiments, once the setting is enabled, it may not be disabled. After enabling the setting, sharing is allowed between all partners with whom a connection is established. Such connections are discussed in more detail in the sharing section of the disclosure.

To enable the setting 303, the user can enter into the set-up menu of the database. Such enablement may only be done by users having administrative privileges. Because the enablement is irreversible in some embodiments, a warning, or similar precautionary message may be provided to the user when such a selection is made. The user can then select enablement and save the settings.

Next, the user can initialize a sharing connection between the partner having tenancy in the database. The database additionally has email templates for this purpose. In some embodiments, these templates may only be customized and sent by an administrative user. The templates may include initial invitation emails to establish a connection with a partner organization, or acceptance, rejection or deactivation emails for use once a connection is established.

The customizable template may also include a message from the user of the system, along with a URL in the body of the email. The URL is provided in order for the receiving party, or partner organization, to easily accept the invitation and establish a connection with the user. At this point, a connection is established between the two partner organizations and sharing may begin.

Referring again to FIG. 3, in step 304, for connections permissions to be given to a user, a "manage connections" permissions is selected by an administrator for each user profile.

These permissions is automatically provided to the administrator. This particular permissions is associated with the CRM to CRM database connections and sharing between such connections. These permissions allows a user of the system to not only access the connections within their records, but also access a tab related to templates for making those connections. These permissions also allows a user to send, accept and manage connections with another database user. In addition, the permissions, allows a user to mass share records between multiple partners at one time. Mass sharing will be discussed further in the sharing section and may be accomplished through selecting a "forward to connections" button on object pages. Data objects, such as contacts, may be updated. Accordingly, if data related to an object is modified, this type of mass sharing may be useful in order to update the shared information in the database user's records and to notify other database users of the update to that shared information. All administrative level users automatically have this "manage connections" permissions enabled and may select which user profiles can also have these permissions.

In step 305, the administrator may add a connections tab to the page layouts of the profiles having the "manage connections" permissions. In the database, the user can build applications in order to customize screen views within their account. As will be discussed further in the API access section, customized applications and instructions may be created by the user as well. However, a standard application and standard tab label is provided in the database and may be selected for connections. Adding this tab allows users to see contact information of the database connections, communicate with those connections, and share records with those connections.

In step 306, the user may then create a template in order to invite a connection to share certain objects. In one embodiment, step 306 can be performed during step 202 of method 200. The actions defining how and what about an object is shared may be automated for connections. In one embodiment, the automation may be performed using templates. Templates allow a user to pre-define publish object and field rules as well as assign active templates to one or more connections. This feature can simplify and streamline the process of setting up connections and allow users to easily connect with thousands of their business partners without any hindrance.

Invitation templates allow users to create pre-defined templates organized by partner type. In one embodiment, connections using the template automatically inherit all the published objects and field rules. For large scale implementations, templates ease the administration of connections and allow users to change the sharing rules with connections with the click of a button.

In one aspect, templates are a sub-tab in the connections main tab so as to show the association with "Connections". In another aspect, only administrators and users with the Manage Connections user profile can create, edit and view templates.

Users can define the name of the template, activate the template, and identify the objects and fields that are published when this template is associated to an invitation or existing connection (active or sent).

In one embodiment, the assigning of a template to a New/Existing connection is as follows. The assigning allows an administrator (admin) or user with Manage Connections permission to associate the template to either a new invitation or existing connection (active or sent). The above can be done via the 'Invite to Connect' mass invite action on the Contacts tab, 'New' invite action on the Connections tab and by editing an active or sent invitation and changing the template association (lookup field to the Templates object). In one aspect, only active templates can be associated to a connection. Though if a template is deactivated, there will be no impact on connections using this template.

In another embodiment, when the template is applied to a connection then the template's "Publish" object and field rules are applied to the connection. New objects/fields may be automatically added to the Publish definition of the connection. If the objects and fields already exist in the connection, then no update should take place on these objects/fields (no un-pub/pub). If an object/field exists on the connection that doesn't exist on the template, then the object/field will be unpublished automatically. A notification message may be sent when an object/field is added or removed from the connection.

An updated template may be applied to all connections using the template. For example, imagine a template is being used by one or more connections. If the template is edited by changing either the Published Object or Field definition, the user should have the ability to apply the changes to all the connections using the template. Again, similar rules as described above may apply. In one aspect, a special button on each template Apply to Connections' performs this action of applying an updated template.

In one embodiment, templates are packagable so that the user can export the templates and associated Publish object and field definitions and publish the same on the service platform. The packaged templates should also be available for download by users. When the package is downloaded, all the associated objects (which may be done just for custom objects) and fields are also created in the organization downloading the package.

FIGS. 5A-5M illustrate application flows for implementing invitation templates according to embodiments of the present invention.

Figure 5A:
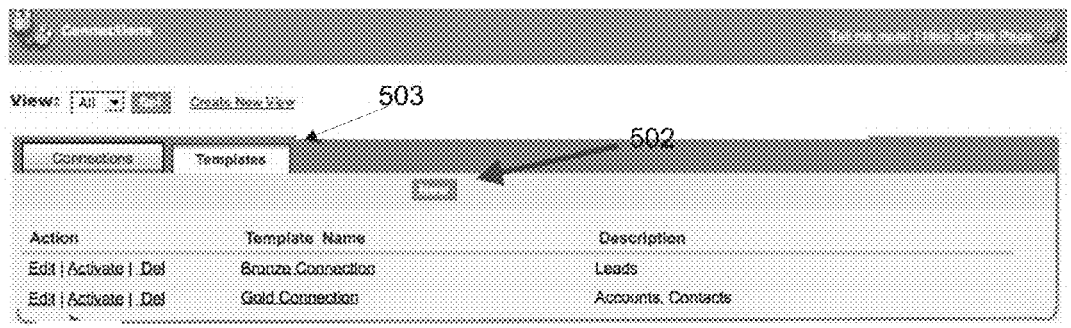
FIGS. 5A-5M illustrate application flows for creating invitation templates according to an embodiment.

FIG. 5A shows a template tab 501 as a sub-tab on the main Connections tab to show the relationship to Connections. In one embodiment, a New Template defines a template name, Owner, Active status with the ability to Save or Save and Publish Objects. The new tab 502 may be selected to create a new template. The templates may be created by class of partner, e.g., gold, bronze, or other status associated with a class of partners for a subscriber.

Figure 5B:
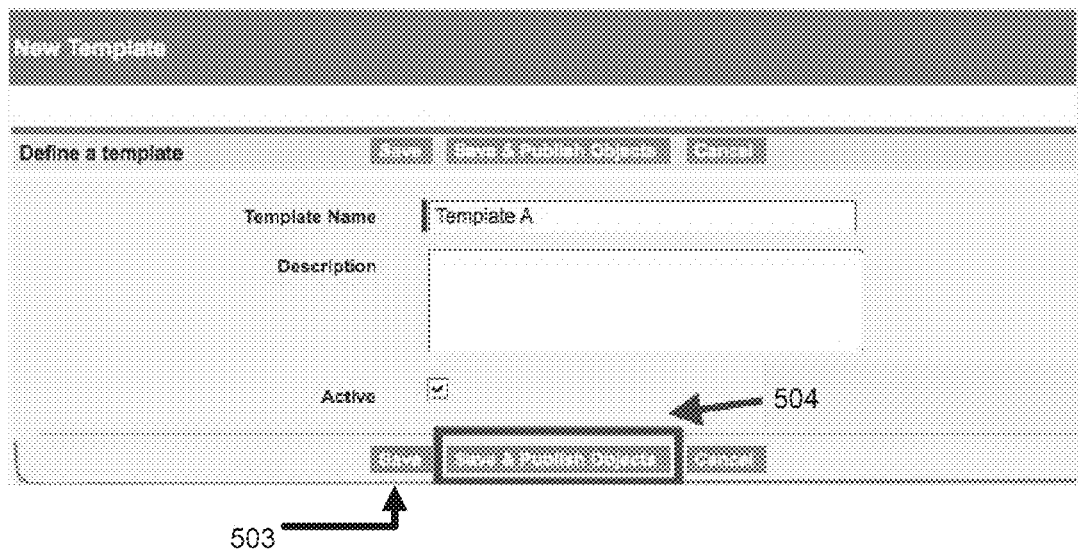

FIG. 5B shows that fields of a template may include a template name, description and active status. In one aspect, only Template Name is a required field. FIG. 5B shows two possible Actions: (1) 'Save' 503, which only saves the header level information; and (2) 'Save and Publish Objects' 504, which not only saves the header level information but also takes the user to the Publish Objects page.

Figure 5C:
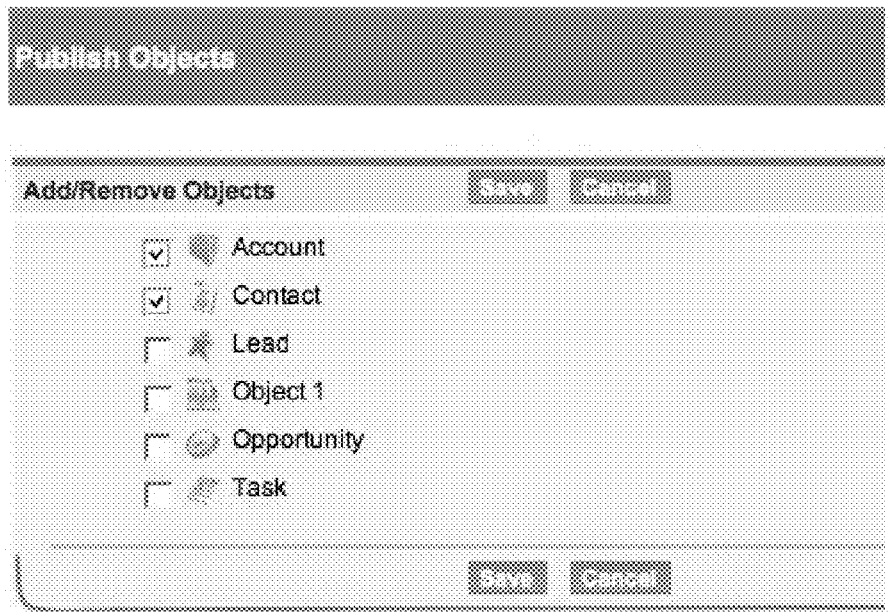

FIG. 5C shows a screen shot for publishing objects according to an embodiment of the present invention. As discussed previously, these objects may be customized objects or include objects such as leads, opportunities, accounts, contacts, tasks, product catalog and opportunity products, cases and case comments and attachments among others. All available objects for sharing will be displayed to the user upon creation of a connection invitation template.

Figure 5D:
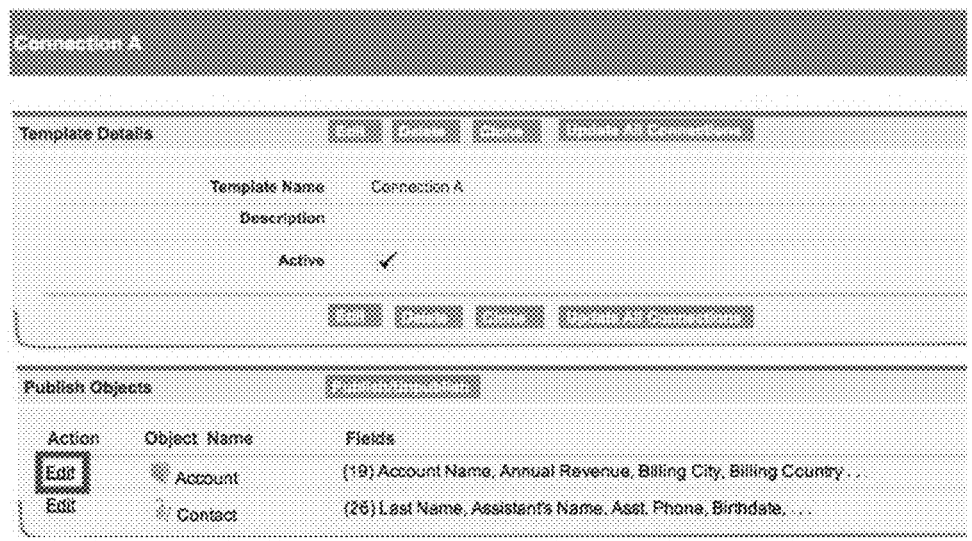
Figure 5E:
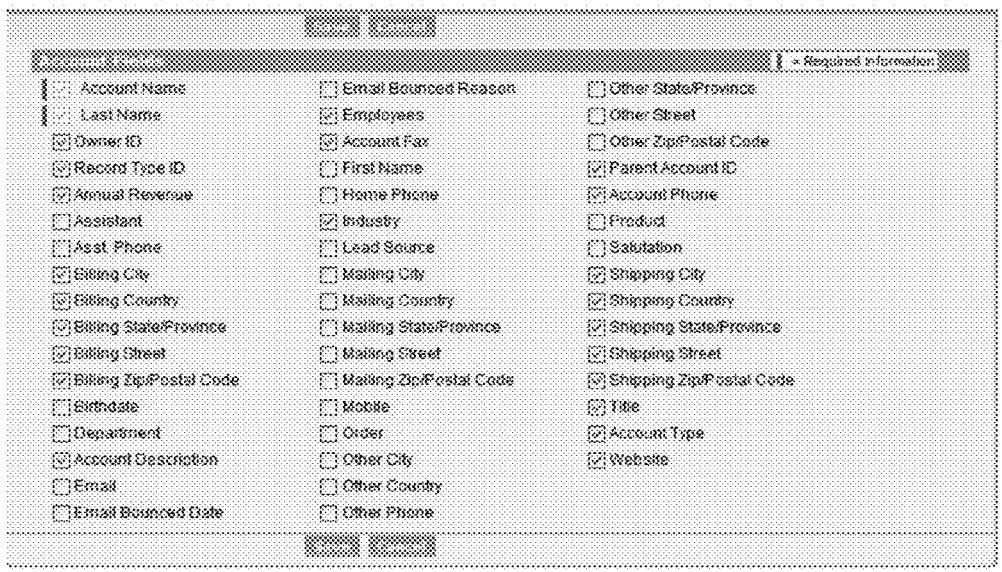

FIG. 5D shows a screenshot for publishing fields. In a first step, an edit link 605 next to object is selected. FIG. 5E shows a second step, where standard and custom fields to publish and save are selected. These fields all point to specific records of a given object.

Figure 5F:
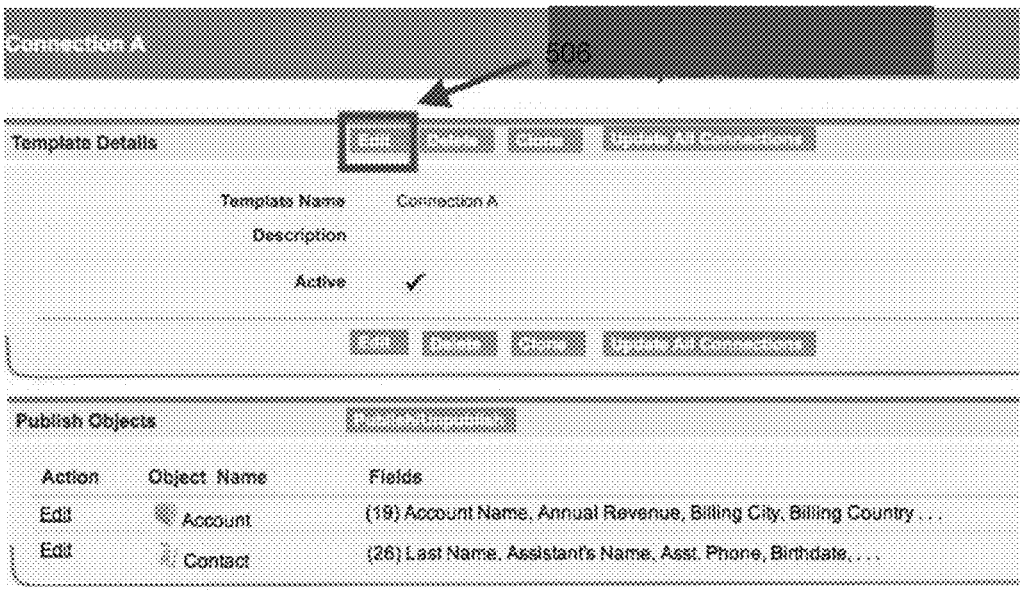

FIG. 5F shows a screen shot for editing 506 a template. In one embodiment, the ability to change an existing template provides some or all the fields being editable, including the Publish Objects/Fields section.

Figure 5G:
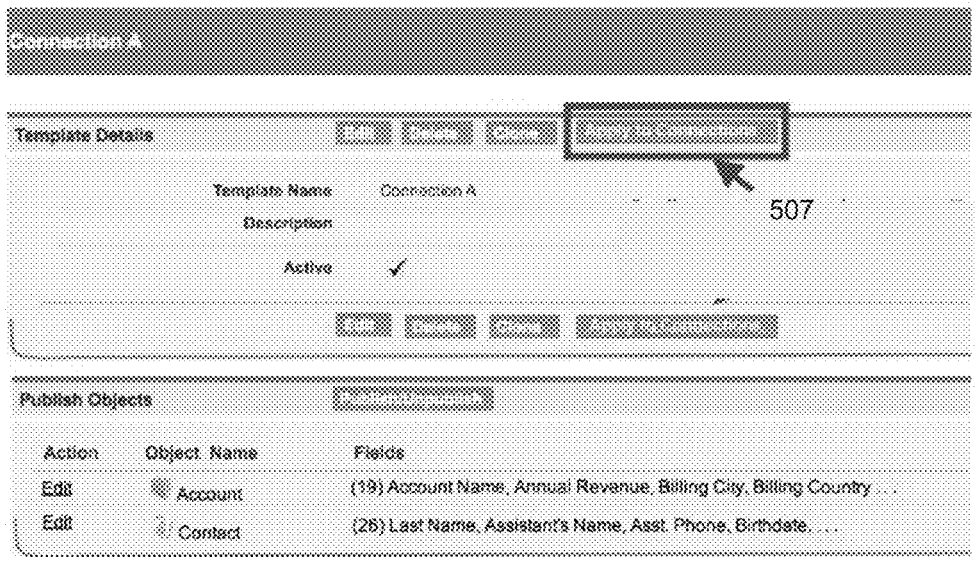

FIG. 5G shows a screenshot for applying Changes to Connections button 507 on the template. After a template is initially made, fields shared with that connection or status of that connection may be modified. Such changes are then applied to all connections having that invitation template. Accordingly, all active and sent invitations will update according to the change.

Figure 5H:
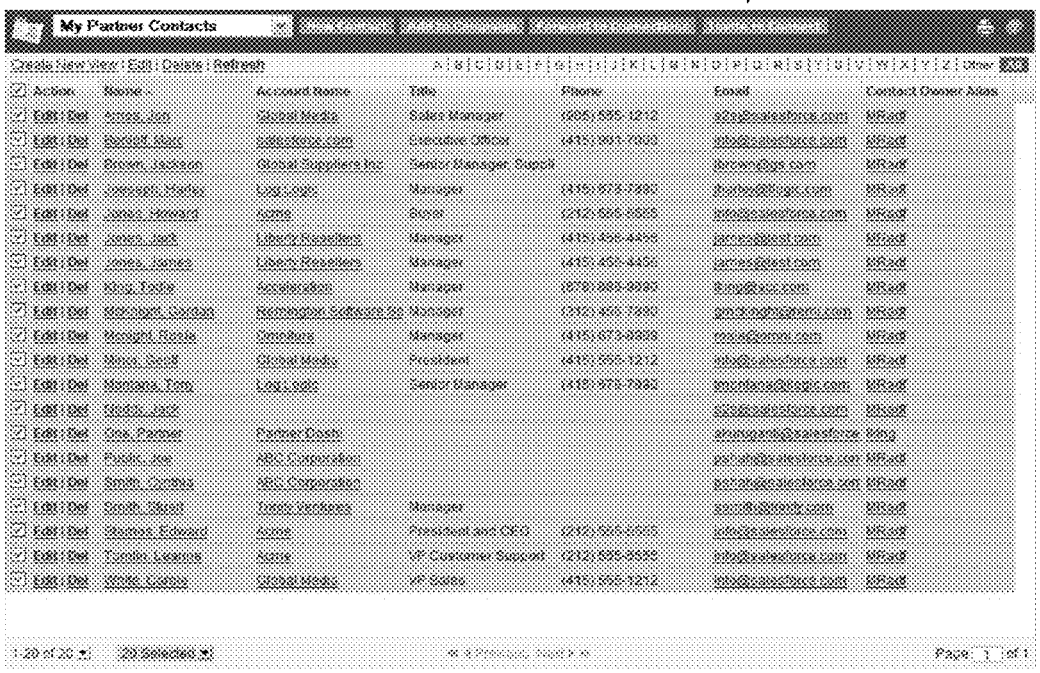

FIG. 5H shows a screenshot for assigning a template to multiple invitations in the 'Invite to Connect' flow. In a first step, contacts are picked to send invitations using the 'Invite to Connect' action 508 on the Contact tab. Only users with "manage connections" permission will see this tab on the contacts page. The user may decide to apply an active invitation template to all new invitations for connections, or may decide to assign specific templates to each individual invitation.

Figure 5I:
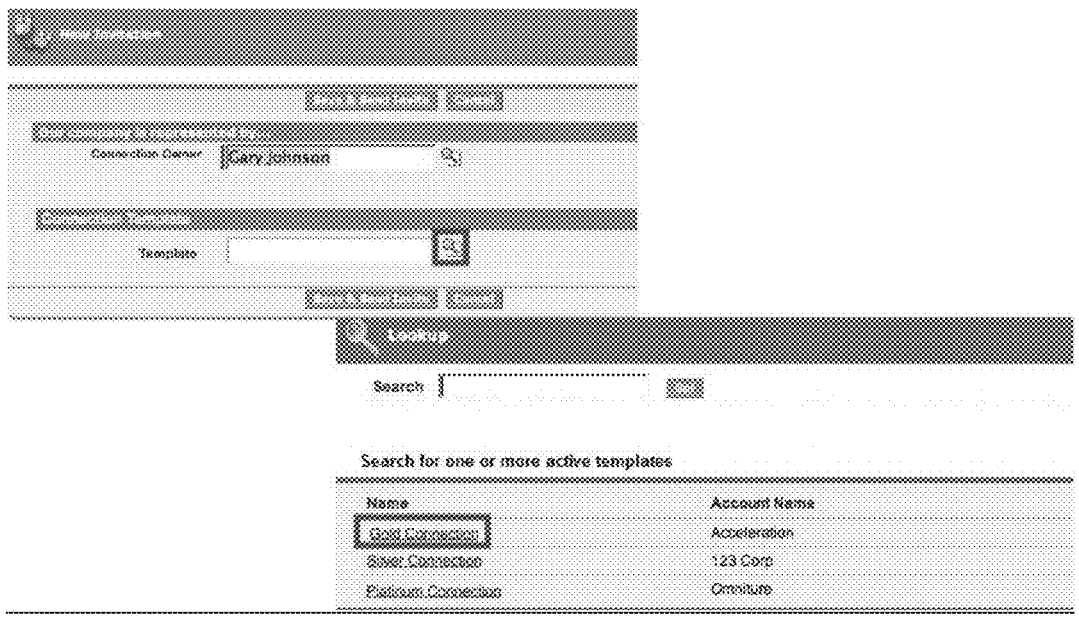
Figure 5J:
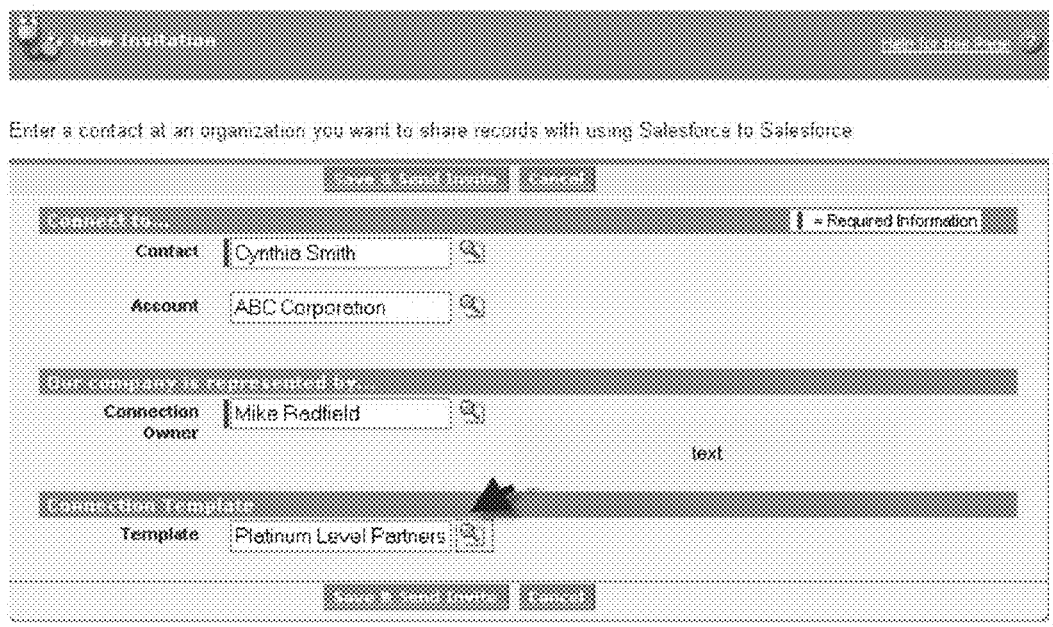

Accordingly, FIG. 5I shows an embodiment, where an Active Template is assigned to the Connections. FIG. 5J shows a step three, where invitations are sent to all contacts. In one embodiment, Published Objects/Fields (as defined by template) are automatically assigned to the Connections.

Figure 5K:
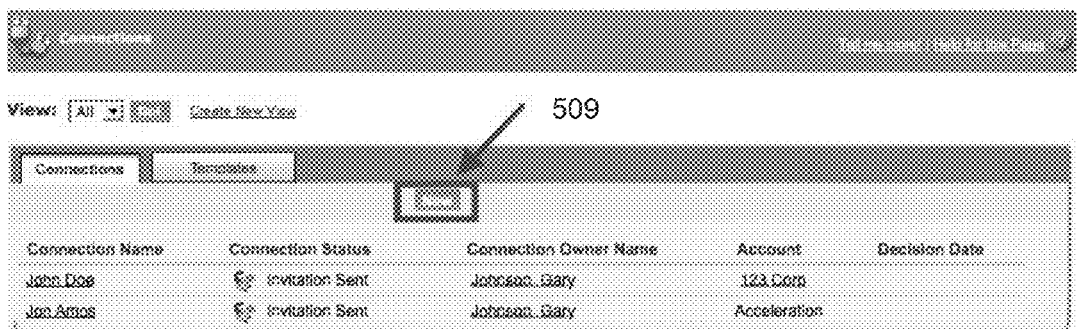
Figure 5L:
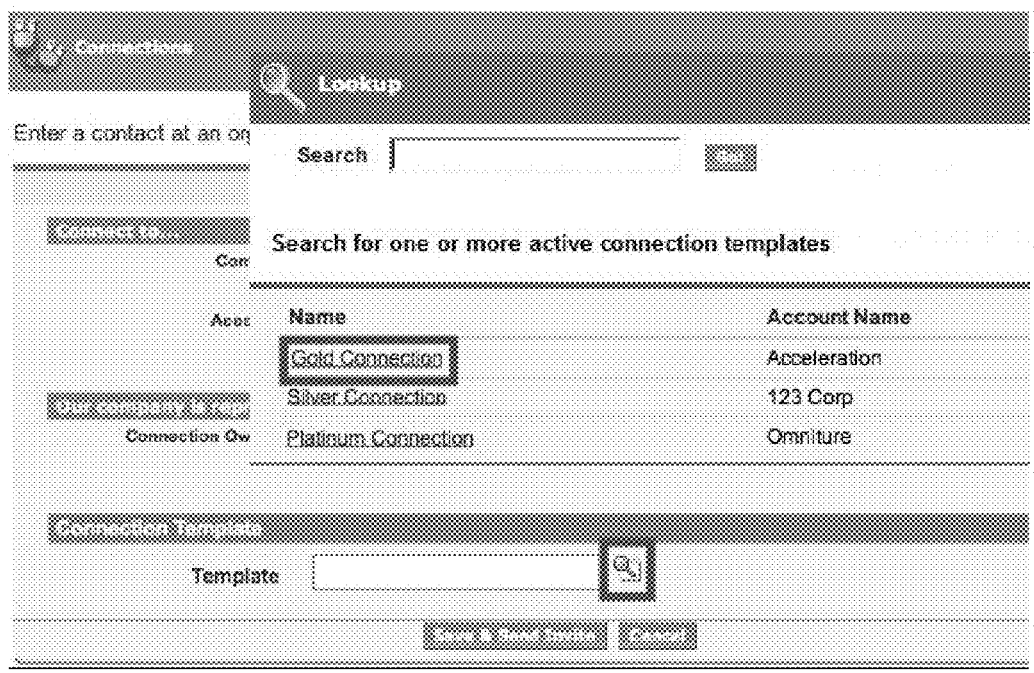
Figure 5M:
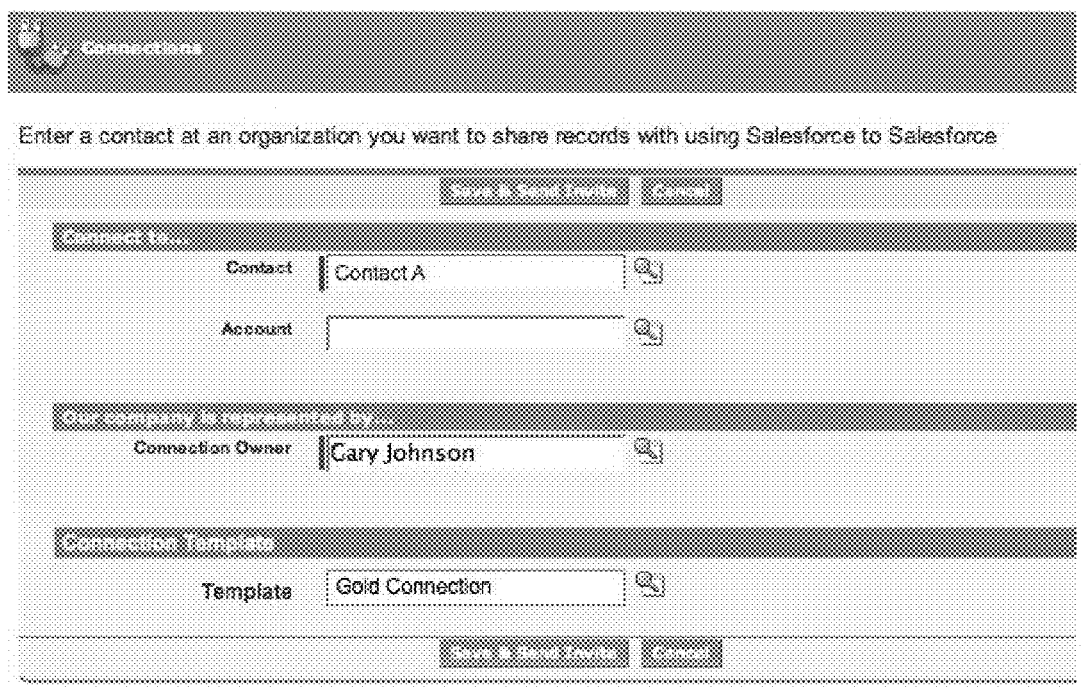

FIG. 5K shows a screenshot for assigning a template to one new invitation using the "New" option 509 on the Connections tab or edit an existing connection and add the template. In a first step, a new connection is created. FIG. 5L shows a second step, where an Active Template is assigned to a Connection. FIG. 5M shows a third step of Saving and Sending 510 an invitation. In one embodiment, Published Objects/Fields (as defined by template) are automatically assigned to a Connection.

In an exemplary embodiment, a vendor can have 3 partner tiers, Platinum, Gold and Bronze partners. The channel manager (CM) may want to share Leads, Opportunities, MDF's and Orders with the platinum tier; share Leads and Opportunities with Gold; and share only Leads with Bronze. Using templates, the CM can define right to the field level the sharing rules by partner by associating the right template to the connections (i.e. Platinum template to platinum partners). Additionally, if the CM wants to add an object or field to one of the templates, the ability exists at automatically update all the connections with the change—with the click of a button.

Referring back to the method in FIG. 3, in step 307, the user may then send the customized invitation template to a contact with established tenancy in the database and make a connection. After receiving an invitation via email or similar electronic means, the recipient may log into the database and view the invitation. In some embodiments, the connection invitation provides date, time, contact and shared object information from the sender of the invitation. The recipient may "Accept", "Decline" or "Decide Later" on the invitation. However, the user needs to accept the invitation in order to share an object. Only users with "manage connections" permissions may accept the invitation.

Figure 7:
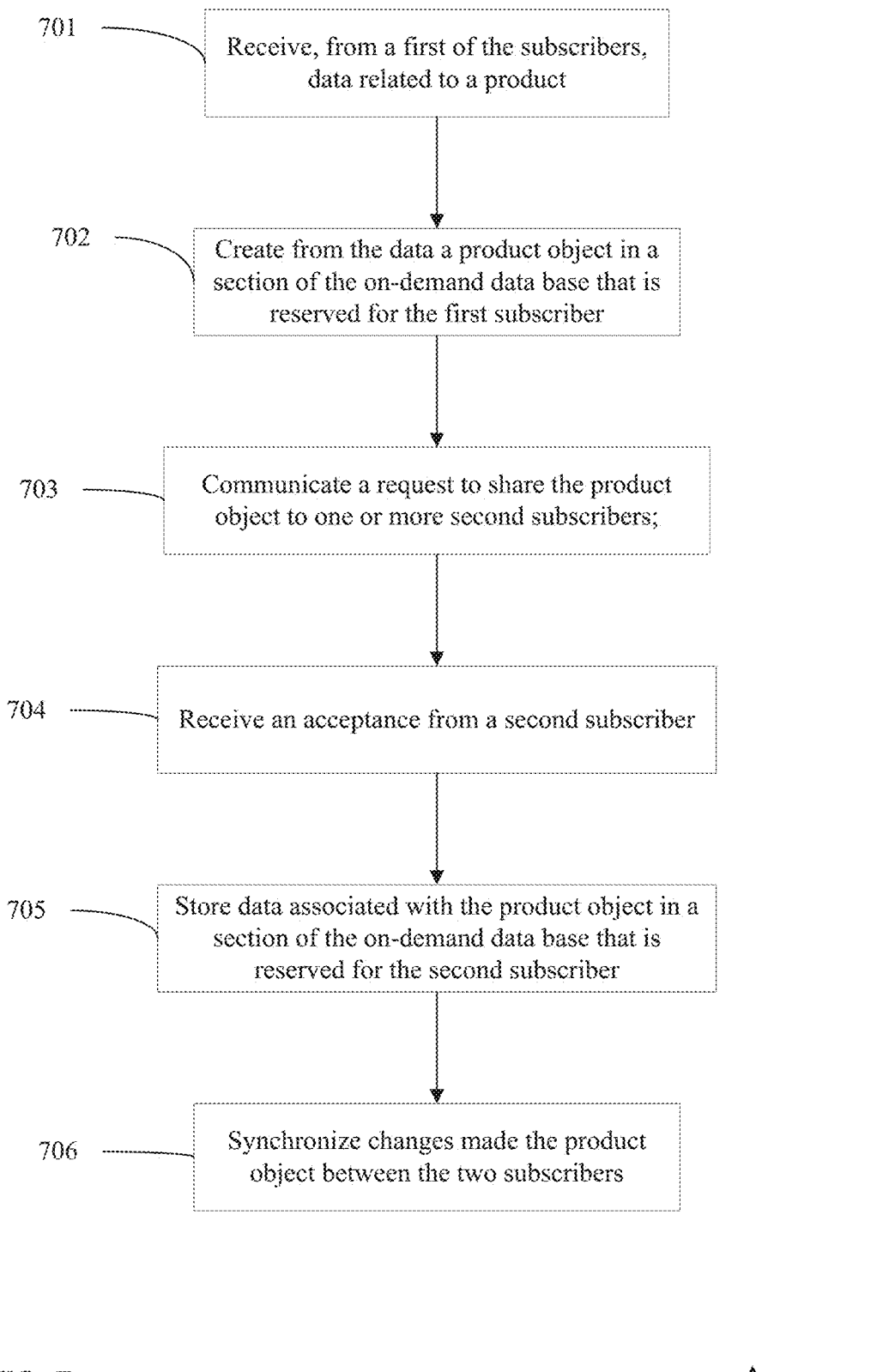
FIG. 7 is a flowchart illustrating a method for sharing information in a supply chain according to an embodiment.

Once the invitation is accepted, the shared records are mapped to records in the recipients account and may be viewed. The user, or sender of the invitation, may view the shared data in the connection details of the partner with whom the connection is established. FIG. 7 shows one embodiment of an exemplary screenshot of an individual connection. The connection details provide the invitation template name, which defines the objects and fields shared with the connection, as well as contact information, connection status and other relevant information. In addition, the connection details may provide a view of what objects and fields are both shared by that connection and subscribed to by the user. All objects and fields may be edited by selecting a link next to the object name. If any modification are made to the object records, selecting the tab labeled "Publish/Unpublish" will update those records for the connection. This functionality is discussed in more detail in the next section.

Figure 6:
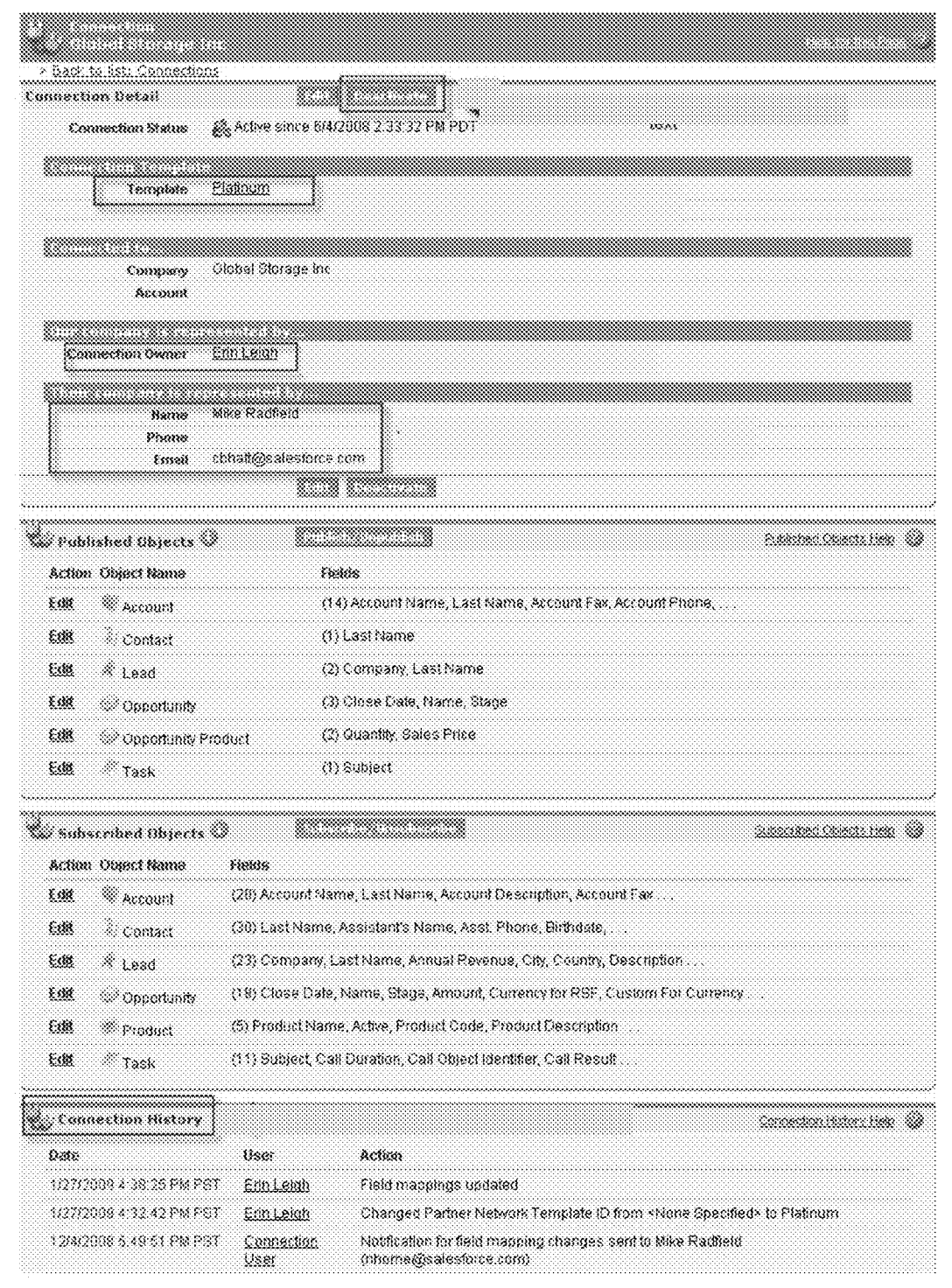

Finally, as shown in FIG. 6, a connection history is provided. The connection history allows for audit tracking of changes made with that connection. This may be useful to track which data has been modified and by whom the modification is made. After a connection has been made and one or more objects have been identified for sharing (along with the mapping the shared/published fields), the subscribers can share specific instances (records) of the shared object.

Sharing Product Objects

FIG. 7 is a flowchart illustrating a method 700 for sharing information according to an embodiment of the present invention. In one aspect, method 700 may be performed after a connection has already been established between two subscribers, e.g. via updating a template for that connection and/or sending an additional invitation to share data with that connection.

In step 701, data related to a product is received at an on-demand data base system from a first of the subscribers, e.g. a tenant in a multi-tenant database. A subscriber may be a one organization of a company, with another subscriber being another organization within the same company.

In step 702, a product object is created from the data and stored in a section of the database reserved for the user, or first subscriber. A product object is a database object that can include information related to a product that a business entity, for example, makes, sells, or uses. Typical fields of the object include a SKU #, a price, and a description. In one embodiment, the product object is created in a section of the on-demand database that is accessibly restricted to the first subscriber. For example, a section may be part of a table to which users of anther subscriber cannot read, write, or change data stored in that section.

In step 703, a request to share the product object with one or more second subscribers is received from the user, or first subscriber and communicated to the second subscribers, or connections of the user. The request may be made as a default operation based on properties of the product object. In one aspect, the request may be made as a one-click option.

In step 704, an acceptance of a second subscriber is received. The acceptance of the second subscriber may also be automated based on rules specified by the second subscriber. For example, the second subscriber may allow an automatic acceptance from a particular first party, and potentially one associated with a particular deal or opportunity, which may have already been shared.

In step 705, data associated with the product object is stored in a section of the on-demand data base that is reserved for the second subscriber. In this manner, employees of the second subscriber may have access to the product object created by the first subscriber in a manner consistent with a product object of the second subscriber. In one embodiment, the data is a copy of the product object, with the data being linked. In another embodiment, there may be one copy of the product object with pointers to the data being stored at the second subscriber.

In step 706, changes made to the product object are synchronized between the two subscribers. For example, if the first subscriber is a vendor and the second subscriber is a supplier, the first subscriber can change the number of products ordered by changing the product object. The number of products ordered as seen by the second subscriber is automatically updated.

Although method 700 is described for sharing a product object, embodiments can also provide sharing any other type of object or other information in a supply chain.

Figure 8A:
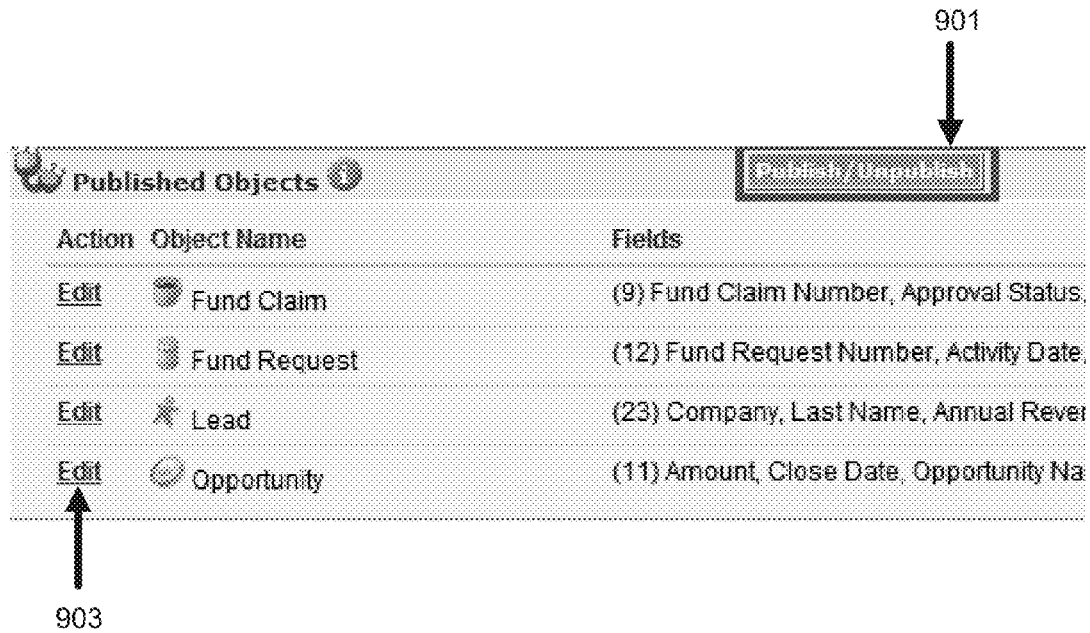
FIGS. 8A-8C illustrates an application flow for publishing objects according to an embodiment.
Figure 8B:
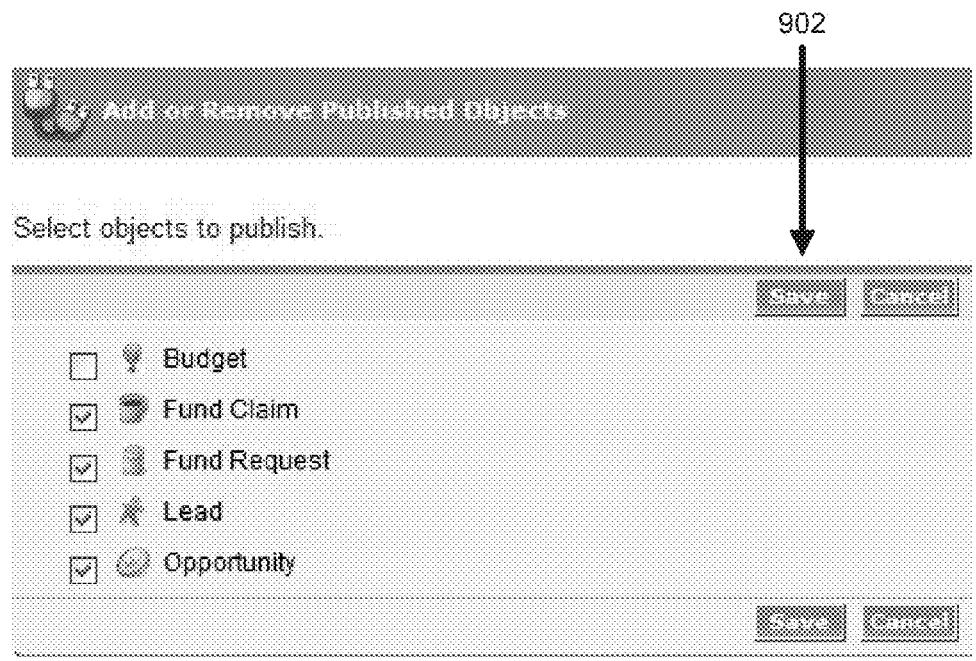

FIG. 8A shows a screenshot of an embodiment where a first subscriber, or user, may select objects to "Publish/Unpublish" 801 with a connection. As shown in FIG. 8B, the user has the ability to add or remove shared objects. If a new object is added, when the user clicks on the "save" tab 802, the object and allowed fields will be mapped, or defined in a connection's in the shared connection's database and the records associated with those object and fields will also be mapped to the connection's database according to the object and field structure. However, this only occurs if the connection is still subscribing to those connections. If an object is removed, the connection will no longer received updates or any other information regarding that object. As discussed previously, these objects may be standard or user customized objects. In addition, the selection of these objects may be pre-defined through the customized connection template.

Figure 8C:
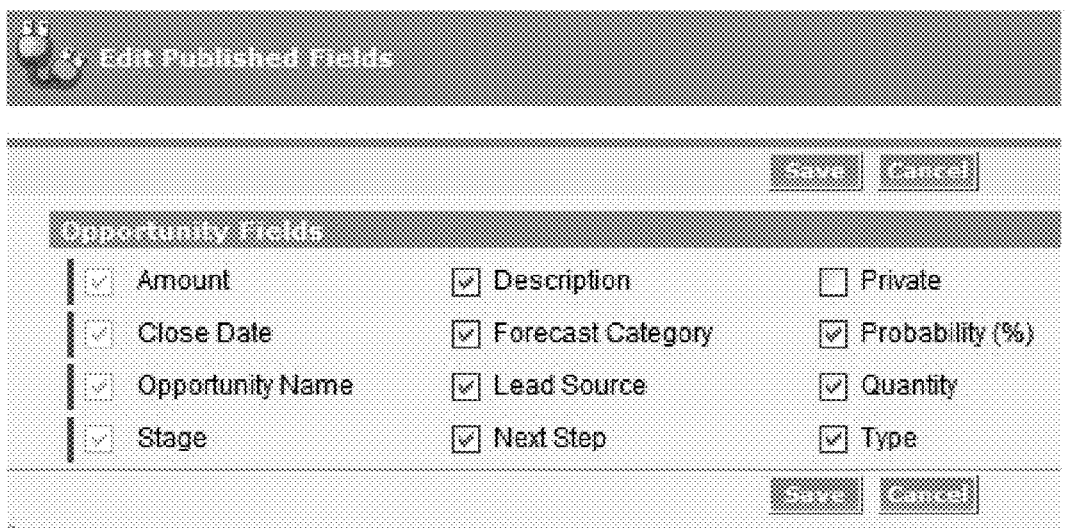

In another embodiment, only certain fields are shared and may be modified at any time. The user selects to "edit" 803 a specific object in order to change the fields provided for that object. As shown in FIG. 8C, the user, or first subscriber may select (publish) fields to share. In another embodiment, certain fields may be required dependent on the object and may provided as a standard within that object type. The user selected fields may then be saved and shared with the connection.

Figure 9A:
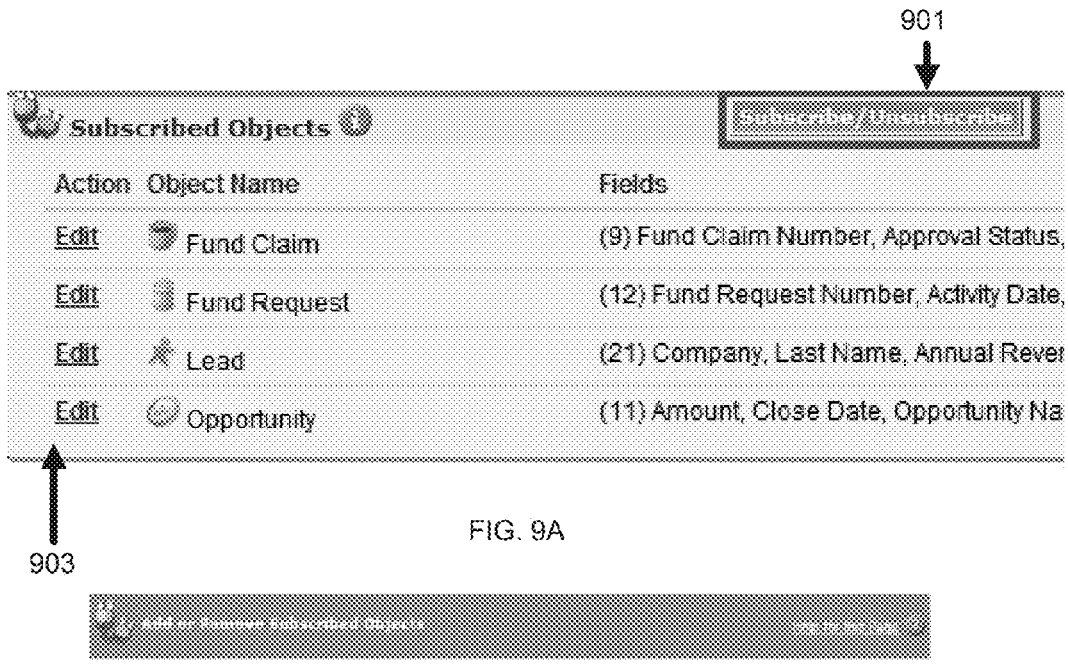
Figure 9B:
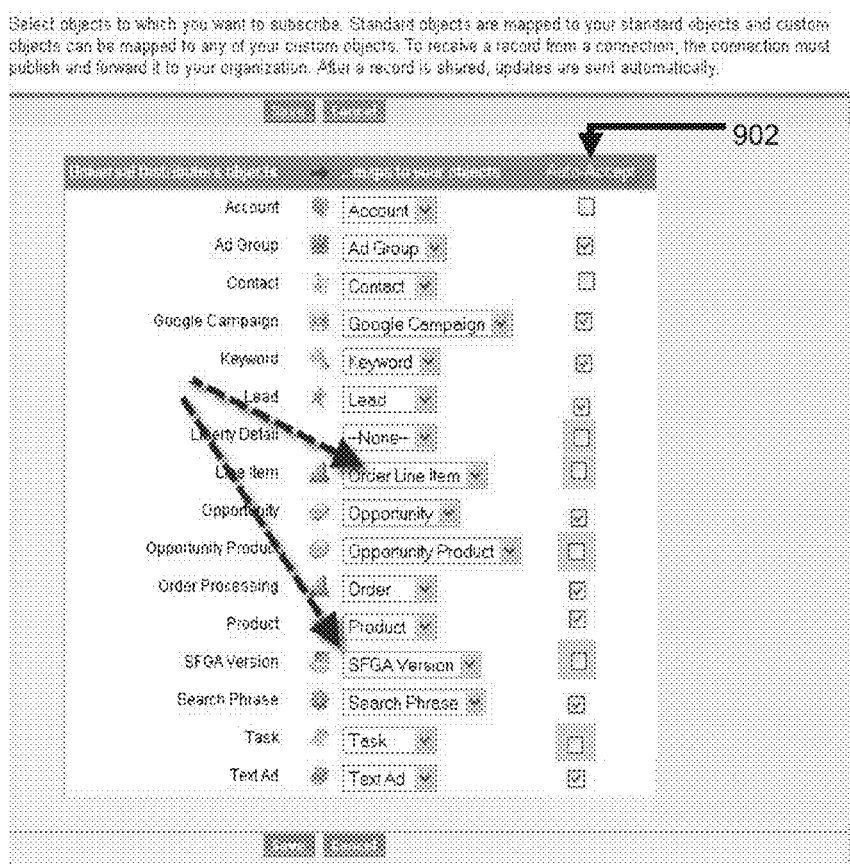

In another embodiment, the user may select (subscribe) to objects shared by a connection. As shown in FIG. 9A, the subscribed objects include all records that are published by a second subscriber, or partner with the first subscriber, or user. However, the user may also elect to not receive update and/or any records pertaining to a partner's shared object even though the partner has published the object. This may occur if the partner is using a specific template to publish objects to a user, and certain objects within that template do not apply to the business relationship between the user and that partner. Accordingly, the user has the ability to customize their database with specific subscribed objects. FIG. 9B, show an exemplary screenshot of how the subscribed objects may be mapped to the user's object within their database. Though standard objects are provided within the system, a user and partner may also have customized names given to specific objects that relate to each other.

FIG. 9A provides an embodiment where the user may elect to automatically accept subscribed objects from a connection. through the "subscribe/unsubscribe" tab 901. FIG. 9B shows the auto accept 902 feature, which may be selected for each object to which the user subscribes and will be automatically mapped to the object location within the user's database when that object is shared by a connection. Selecting the auto-accept feature allows the records, or instances of that object to be automatically mapped into a connections' database. If a child record is shared by a connection, or partner organization, the child record is associated automatically with a parent record and entered into the first subscriber's database. However, if a record is shared as a child of another record, then it may not be automatically inserted until the parent record is manually or automatically accepted first.

Figure 9C:
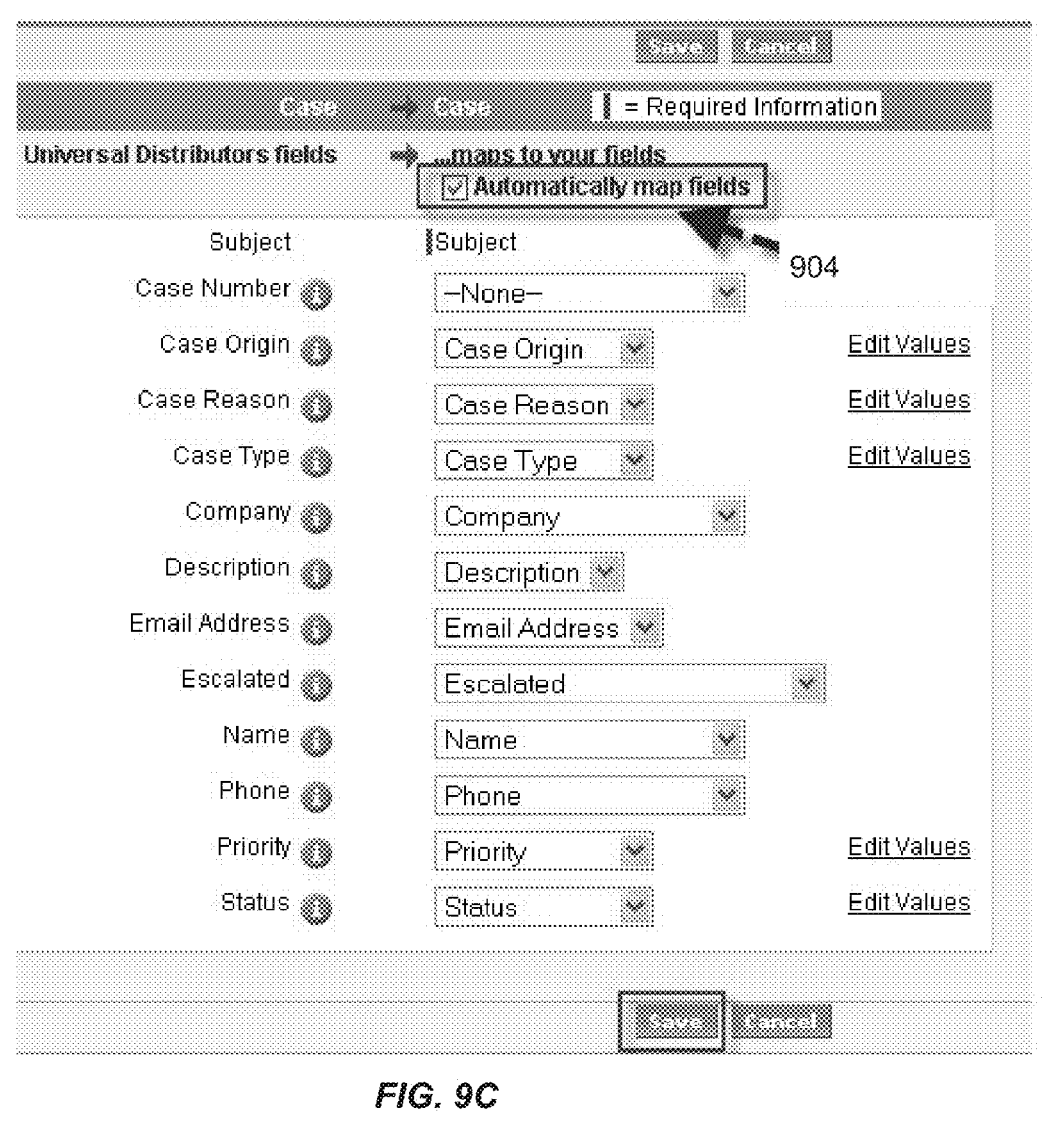

Referring back to FIG. 9A, the user may decided to customize fields of a subscribed object. Similar to field modification on published object, this is be done by selecting the "edit" link 903 next to a particular subscribed object. As shown in FIG. 9C, when the fields are selected, the user also has the ability to manually map the fields to those within their database. This may be necessary if fields are customized, having a different name, and/or if an auto-number or lookup/reference field needs to be mapped to text field. In another embodiment, as shown in FIG. 9C, the user may elect to automatically map 904 the subscribed fields to fields within their database. This feature may compare field names and/or data in those fields to correctly map the fields. In addition, if a user deselects this features, the fields will no longer be mapped to each other unless the user manually selects each mapping.

In some embodiments, the subscribed objects may require certain fields to be shared. Accordingly, these fields may be not be modifiable and provided as standard fields for that subscribed object.

The ability to update and map fields within connections may also allow for flexible process integration between connections by picklist value mapping. For example, one field of an object for a first tenant may be a picklist that has multiple values (e.g. 1-10). This field may also correspond to a picklist for the corresponding object of the other tenant. However, the picklist values may be different (e.g. 1-5). A mapping can be created to map the one set of picklist values to the other picklist values. As shown in FIG. 9C, an "edit value" link may be located next to specific fields which have multiple values for mapping. As shown in FIG. 9C, an "edit value" link may be located next to specific fields which have multiple values for mapping. When this link is selected, the mapping of the subscribed fields to the user's fields may provide real-time updates.

Products can be shared either as a member of the parent record (e.g. Account), individually or en-masse using a 'Forward to Connections' link on the Products list view. Accordingly, the products may be forwarded multiple connections and share thousands of records with those connections. Again, when a product or parent record is shared all selected child records are also forwarded to those connections. In one embodiment, limitations on the amount of child records forwarded may be required.

In one aspect, only a record may be shared or forwarded In another embodiment, a record related to shared parent may be also be forwarded. Accordingly, a record and related child records may be forwarded together. In order to forward a record, the user is provided with a related list of available connections to which a record may be sent. Only objects published to and subscribed by at least one connection are made available within the related lists. In addition, objects such as tasks, attachments, and opportunity products may be shared when forwarding an opportunity to a connection. In order to forward the records, the user needs to own the record, i.e. the user may not forward all shared records unless having permissions to do so. Administrators may forward all records. The user may customize which parent and child records to forward, dependent on the connection with whom they are shared.

Alternatively, the user may elect to individually share related records, of a shared parent record. In this embodiment, the user opens the shared parent record details and forwards the record via the "Manage Connections" link, which was previously described. Forwarding these records may only be done through users with connections permissions and for records owned by the user. In one embodiment, on the related list, if the parent is not shared, the 'Manage Connections' link is not shown.

Furthermore, a record related to shared parent and shared related child records may be forwarded as long as the parent record has been accepted. When any related child record is shared, the record is automatically related to the parent record within the connection's records. If a relationship cannot be established between a shared child record within a partner, or recipient's account, the recipient may need to manually accept the record and provide a parent record name.

In some embodiments, the user may wish to manually accept parent records. In such embodiments, the user may chose to create a customized list view of the shared parent records by applying filters to the records received from connections. Accordingly, when records are shared, they arrive in a the user's inbox in a list view specified by the user. This customization may only be performed if an object has been subscribed to by at least one connection of the user. As described previously, if an auto accept is selected for the shared objects with a connection, the shared objects, or records related thereto will not be shown to the user.

In a further embodiment, the user may assign rules to the shared records upon acceptance of that record. This may be particularly useful when a new lead record is shared and the user wants to assign that lead to a particular record within their account, or another user within their organization. The assignment rules may be established and automatically provided, or manually chosen by the user when the lead is accepted.

In another embodiment, if a user manually accepts an opportunity from a connection, the user may chose to assign the opportunity to a related record within their database or a new or existing account or opportunity.

In a further embodiment, when an account is shared from a partner, may chose to create a new account or link the new account to an existing account. Further, the user may also assign the account to a contact within their organization.

In another embodiment, if a new contact is shared, the user may manually assign that contact to an existing account within their database, create a new account and assign the contact to a user within the organization. The option to assign a contact is only available if the contact is not associated with an existing account, i.e. it is not a child record.

Accordingly, in the instance when a user manually accepts a parent record, different fields may be made available during acceptance, dependent on the type of parent record shared. If the user chooses to manually accept a parent record, then record may be assigned to a specific records existing on the database.

In a further embodiment, the user may also share attachments associated with a product object with one or more connections. These attachments are stored similar to a child record and may be forwarded and/or published when other object related fields and/or data is modified and updated.

Figures 10A, 10B:
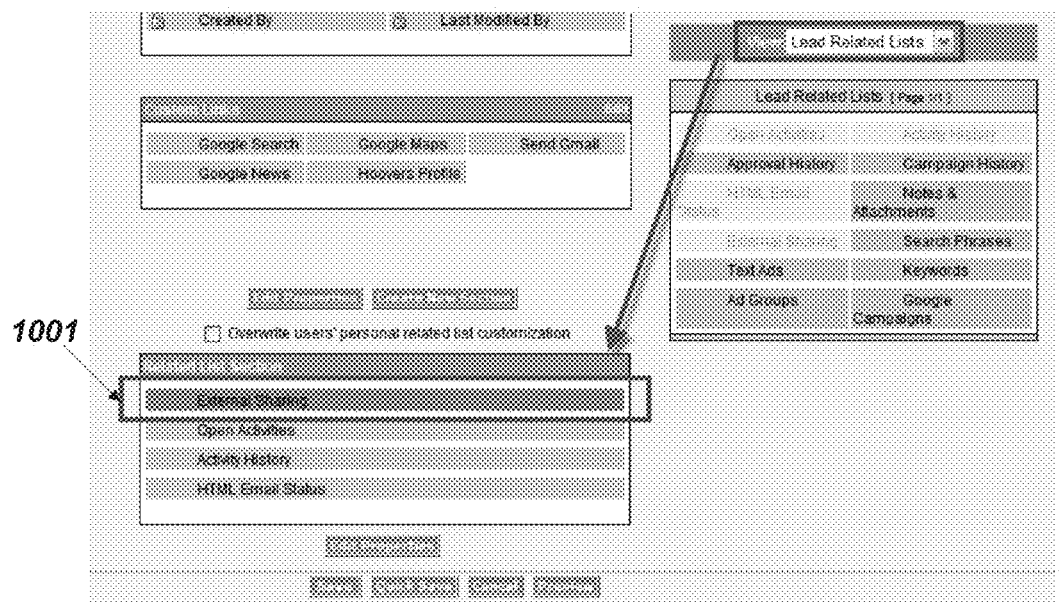
FIGS. 10A-10C illustrate application flows for modifying the page layout according to an embodiment.

In order for a user to have increased visibility of the records shared, the page layout may be customized to provide an external related lists link, which shows details of the records shared. FIG. 10A shows an exemplary screenshot of this link in a user's profile. This additional section should not be added to profiles that do not have the "manage connections" permission. The related lists section allows for users to view lists related to different records of an object being shared with their connections. Objects may be leads, opportunities, accounts, contacts, task, product catalogs and opportunity products, cases, and any other customized object created by the user. Each object has lists relating to the records of the object, such as the history of the object, activities pertaining to the object and status regarding the object, etc. may be provided. Adding an "External Sharing" list section displays connections with whom the records of an object are being shared. Once this section is added to the related list section, a user may view the current connections sharing that object information and manually terminate sharing with that connection 1002. FIG. 10B shows an External Sharing Related list supporting multiple Active (sent) connections. When the sharing is terminated in this list 1002, all prior information shared to the user's partner is still made available to the partner. However, all updates pertaining to that particular object are terminated. Thus, the user may no longer receive and/or send updates with that particular connection.

Figure 10C:
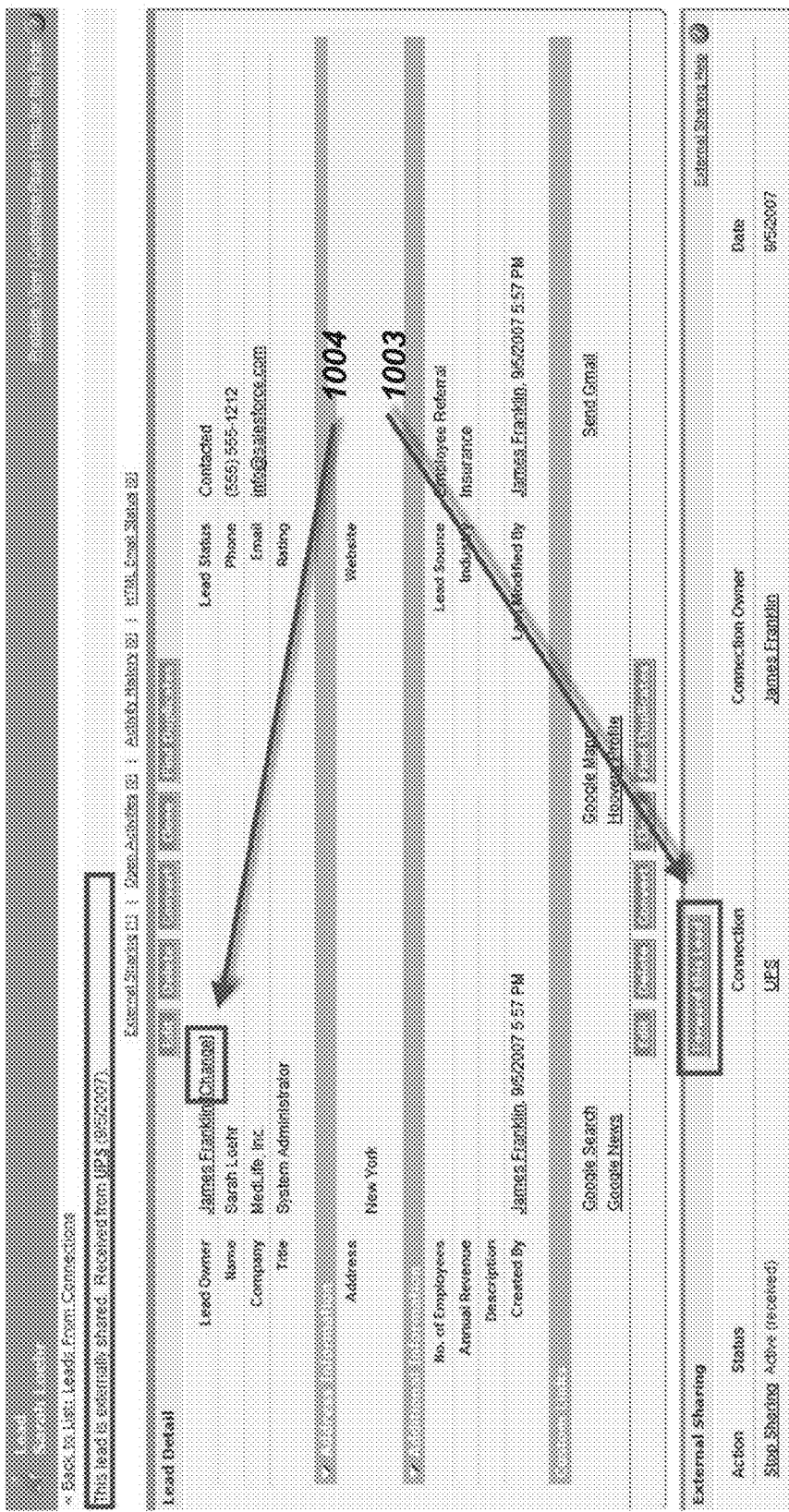

FIG. 10C provides an entire screenshot of what may be seen by the user of the system when the "external sharing" section is added to a shared object page. In this embodiment, the object is only shared with one connection. In one embodiment, the 'Forward this Object' link 1003 will also be available even if the record has already been forwarded and shared with another connection (i.e. already have Active(sent) status). When the object is forwarded to another connection, only the published fields are forwarded. Accordingly, the fields relating to an entire object may not be shared with an established connection and are customizable by the owner of that object.

In an alternative embodiment, the object may be forwarded and shared with a new connection if the owner of that connection is changed 1004.

Another modification that may be desirable in the related lists section is the addition of both a received and a sent connection column. The user may simply select "edit properties" of the related lists, and add fields to this section. By adding these two additional fields, the user may be able to quickly view the connection whom sent a record of an object ("received connection name") as well as forward a record to one or more connections ("sent connection name"). This allows a user to share any related record within a shared object as well as individual tasks and opportunity products. The user does not have to update and/or share an entire object in order for a particular record to be forwarded to a partner. Additionally, the user may easily view who is responsible for sharing a particular record when more than one record is available regarding a particular object shared.

In an exemplary embodiment, when sharing a product, a 'Product from Connections' view can include the following fields: Connection Name, Sent Date, Product Name, Product Code, Product Family and Parent Record Name. In one aspect, the Parent Record Name is set if the Product is shared as a child of another record and is populated with the name of the parent record including type of object (e.g. Account: Acme). This may occur when an entire parent (e.g. an account) is shared, with the product object being shared as a child of the parent object.

The system first tries to insert the product and relate it to the shared parent record, however in some circumstances it may not be possible to commit this relationship at which time the product record will be visible in this view.

In one embodiment, the user may create multiple views using the criteria above and assign the same views to multiple internal users using role assignments. In another embodiment, if a product is shared by the user to a partner (e.g. a subscriber to which an object is shared), the connection owner in the partners organization receives an email notification.

If a product is shared as a parent, then the partner may accept the product using the 'Products from Connections' view described above. In one aspect, a requirement may be to either create a new product or link to an existing product. In another aspect, there may be no 'Owner' assignment requirements since products may not have an owner.

In one embodiment, product reports can be created using custom report types (CRT's). Using these reports users can see which products have been shared and updated by a connection. These reports can be run on specific data in fields such as accounts and contacts, opportunities, funds, etc. For example, a report may be run on a "Connections with Accounts" under the "Accounts and Contacts" data type. The report types may be additionally customized by the user, dependent on the customized objects within the user's account.

In another embodiment, validation rules can apply to Products as well. Users can use "Received Connection Name/ID" along with "Current User Alias contains pnet" to ignore validation rules when the product is shared with a connection. A user can use "Received Connection Name" and "Current User contains pnet" to run workflow rules. "Received Connection Name" and "Sent Connection Name" are available to create filter list views to show all products shared with one or more connections.

Finally, a user may wish to share a product catalog with a connection. In this embodiment, the product catalog may be manually accepted as a parent record, with assignment fields generated specifically for product catalog. If the catalog is a child record of an account, no acceptance is required by the user. If shared, a product catalog may include standard fields such as quantity schedules and revenue schedules.

In one embodiment, if "Quantity Schedules" (a field of the product object) are enabled and a customer is subscribing to the "Quantity Schedule" fields, then the user should ensure that all fields are subscribed to the same quantity schedule fields. For example, a partner's "Number of Quantity Installments" can be mapped to the user's "Number of Quantity Installments." Other fields that are affected include Quantity Installment Period, Quantity Installment Period & Quantity Scheduling Enabled, which may be mapped as well.

In another embodiment, if "Revenue Schedules" are enabled and the user is subscribing to the "Revenue Schedule" fields then the user should ensure all fields are subscribed to the same revenue schedule fields. For example, a partner's "Number of Revenue Installments" can be mapped to the user's "Number of Revenue Installments." Other fields affected include Revenue Installment Period, Revenue Schedule Type & Revenue Scheduling Enabled.

As an example of implementation, hi-tech hardware vendors can share their product SKU's with resellers and distributors who in-turn can have the latest and greatest information when registering a deal for a new prospect. Enabling these features allows vendors and partners to have real-time, in-sync product information while at the same time allow partners to register opportunities with the right product SKU's attached.

Also, users can share formula and roll-up summary fields with connections. With the availability of this feature, embodiments support all the major standard and custom field types. For example, a reseller may be selling products from multiple vendors on the same opportunity and only show the applicable amount to each vendor. Using RSF (roll-up summary) the reseller could share the right amount with each vendor based on the product sold.

In one embodiment in Error Logging, if an insert (accept) or update fails either due to system down, validation failure or uniqueness constraint then the following is logged in the Connection audit: Object (id if available) & Message. A task/email may be created for the "connection owner" for the target organization with the audit details in the subject.

In one embodiment, if the error takes place while accepting a record using the UI the user is given a message: 'Failed to Accept one or more records since Validation or Uniqueness constraint was not met: check the connection audit trail for more details.

Similar to sharing product objects, other types of objects may be shared between connections. These objects may be related.

Sharing Opportunity Objects

In some embodiments, data related to a product object and an opportunity can be shared. An opportunity is a business opportunity (e.g. a deal) between two or more subscribers of the on-demand database service.

Opportunity Products are similar to Detail objects but in this case are related to both Opportunities (master) as well as the Product object. In one embodiment, the quantity is a required field to be shared (e.g. published and subscribed).

Opportunity Products can be shared either as a member of the parent opportunity or individually using the "Manage Connections" link on the Connection Sent column. In either case, the opportunity product may be automatically associated to the parent opportunity in the target organization (e.g. the second subscriber). In one embodiment, the opportunity product is not shared on its own.

In one embodiment, the following rules are adhered to when sharing an opportunity product. The Opportunity is shared with the target connection(s), e.g. the second subscriber. Opportunity product is published and subscribed to the target organization. The related product is also be shared with the same target organization. The price book on the target organization's opportunity has the product to which the opportunity product is related to. If one or more of the requirements above is not met, the opportunity product is not be shared with the target organization.

In another embodiment, there is no manual acceptance required for Opportunity Products. The records are automatically associated to the parent opportunity. In other words, the acceptance is automatic, for example, as set or hardwired by code.

In addition, opportunity product reports can be created using CRT's as discussed previously. Additionally, the "Opportunity with Products" and "Opportunity with Products and Schedules" reports should be modified to include the "Connection" table so that the user can see all opportunity products shared with one or more connections.

Validation Rules apply to Opportunity Products as well. A user can use "Received Connection Name/ID" along with "Current User Alias contains pnet" to ignore validation rules when the opportunity product is shared with a connection. A user can use "Received Connection Name" and "Current User Alias contains pnet" to run workflow rules. In one embodiment, there are no list views for Opportunity Products.

One to Many Sharing

An object may be shared from one subscriber to many second subscribers by selecting a link on that product object detail page. For example, the product object may be an account, a lead, an opportunity or other object recited in the disclosure. Accordingly, a vendor can share the same opportunity downstream with an ISV partner, reseller, distributor and upstream with the supplier. While the downstream partners are working together to close the deal, the supplier has real-time information on product requirements, close dates and stage enabling the supplier to source the right parts at the right time. One to many (1:Many) will enable a host of use cases including consulting companies bidding for the same project (e.g. EDS and IBM), and user master use cases.

Another example is where a new deal where the CM needs to collaborate with the local reseller as well as the consulting partner to close a deal with a user. At the same time, the CM may want to provide visibility upstream to the supplier who needs to be aware of when the opportunity will close so that the supplier can make the requisite orders and ensure the shipping company is notified of the new user. All this real-time automatic co-ordination is now possible with 1:Many. For example, a vendor can share with a Distributor, Supplier, Reseller, and a Solution Provider.

Therefore, the advantages of having database connections is that real-time updates and data can be communication between users, such as vendors, resellers, manufacturers and other agencies. Each user may have access to shared records from other partners in the business supply chain. In addition, embodiments can allow a user to share the same record with multiple business partners at the same time. This feature can be key to collaborative selling. As described above, these records are automatically kept in synch and may even be audited, if desired by the user of an account. Accordingly, users can keep track of the changed record as well as easily receive and send updates to/from multiple partners regarding that record in a timely manner and without additional communication steps required.

Queues

In one embodiment, related items may be shared when a record is forwarded after being assigned to a queue containing connections as members. For example, the record may be a mass lead, case or a custom object and may be sent to a queue when no partner connection is established. Accordingly, the record is made available to the next member of the queue. To this end, a setup option may enable sharing the related record when a record is forwarded due to queue assignment. This can apply to all connections and all types of objects that queues support. If the above is set, then anytime a record is forwarded due to queue assignment all the related records that are published to the other organizations should also be forwarded after the parent record has been accepted.

API Access

In one embodiment, users can write Apex (or other application code) and automatically share/stop sharing records based on changes to one or more fields on a record. For example, for an API Forward, the user can forward a record as a parent, forward a parent and child records the user has access to, and forward a child that is linked to a shared parent.

For an API Method, the following function interface may be used: forwardToConnection(Id, Map <Child Object Names>, Parent Record ID). In one embodiment, only Id is required, with everything else being optional. In one aspect, if the child is supplied, then this acts as a deep share of parent with children. In another aspect, if the parent record Id is supplied, this acts as deep share of child with parent also shared (this will support 2 levels of sharing).

For API Stop Sharing, the following function interface may be used: API Method: stopSharingWithConnection (Id, Inbound Connection Id, Map <Outbound Connection Ids>). In one embodiment, only Id is required. In one aspect, if this is supplied while the others are empty then both inbound and outbound are disconnected. In another aspect, if one or other (inbound and/or outbound) is supplied then only that connection is disconnected (i.e. inbound or outbound)

In one embodiment, users can write intelligent rules when the sharing status on a record changes (e.g. Lead has been converted by partner organization—automatically convert lead into opportunity and share that opportunity back with the partner). External Sharing Related list may be made api available.

Accordingly, an administrator can auto-share any record. For example, based on specific criteria the administrator can automatically share an account and associated opportunities, contacts and tasks with multiple partners. Using an Apex trigger or even the excel connector/data loader the admin can make this happen.

Also, in one embodiment, users can use Apex triggers, custom code or other options including the excel connector and data loader to automatically share records with one or more connections. The new API methods can also be used to stop sharing with one or more connections. A benefit of this feature is two fold: users can define custom criteria to share/stop share records and partners can build applications triggering s2s functionality and make this available on the AppExchange.

It should be understood that embodiments of the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method, comprising:
providing, by a system, memory shared by multiple subscribers of the system each having an account with the system, where the memory includes logically separated storage areas dedicated to each of the accounts such that data stored in a storage area dedicated to an account of one of the subscribers of the system is inaccessible to other subscribers of the system;
receiving, by the system, a request from a first subscriber of the system to send a connection request message to multiple receiving parties;
sending, by the system, the connection request message to the receiving parties;
receiving, by the system, a response to the connection request message from each of the receiving parties;
determining, by the system, that the receiving parties are each another subscriber of the system based on the responses;

for each of the receiving parties establishing, by the system, a connection between the first subscriber and the another subscriber of the system that is the receiving party;

identifying, by the system, a predefined connection template assigned to the connections by the first subscriber, the predefined connection template indicating a first object stored in the storage area of the system associated with the first subscriber that is shared via the connections; and storing, by the system, the first object shared via the connections in the storage areas of the system associated with the other subscribers of the system by:

(a) for a first one of the other subscribers of the system:
  receiving, by the system, for each of a plurality of fields of the first object from the first one of the other subscribers, a mapping between the field of the first object and an existing field that is already in the storage area of the system dedicated to the account of the first one of the other subscribers; and
  based on the mapping received from the first one of the other subscribers, updating, by the system, the existing fields that are in the storage area of the system dedicated to the account of the first one of the other subscribers with values of the fields of the first object; and (b) for a second one of the other subscribers of the system:
  identifying, by the system, a preconfigured setting of the second one of the other subscribers indicating that each of the fields of the first object is to be automatically mapped to an existing field that is already in the storage area of the system dedicated to the account of the second one of the other subscribers;
  in response to identifying the preconfigured setting, automatically creating, by the system, a mapping between each of the fields of the first object and one of the existing fields that is already in the storage area of the system dedicated to the account of the second one of the other subscribers using at least one of a field name and a field value; and
  based on the automatically created mapping, updating, by the system, the existing fields that are in the storage area of the system dedicated to the account of the second one of the other subscribers with the values of the fields of the first object;

wherein the existing fields that are already in the storage area of the system dedicated to the account of the first one of the other subscribers include fields of a second object that is already in the storage area of the system dedicated to the account of the first one of the other subscribers;

wherein the existing fields that are already in the storage area of the system dedicated to the account of the second one of the other subscribers include fields of a third object that is already in the storage area of the system dedicated to the account of the second one of the other subscribers;

wherein the first object relates to the second object that is already in the storage area of the system dedicated to the account of the first one of the other subscribers, and a customization by the first subscriber for the first object differs from a customization by the first one of the other subscribers for the second object that is already in the storage area of the system dedicated to the account of the first one of the other subscribers;

wherein the first object relates to the third object that is already in the storage area of the system dedicated to the account of the second one of the other subscribers, and the customization by the first subscriber for the first object differs from a customization by the second one of the other subscribers for the third object that is already in the storage area of the system dedicated to the account of the second one of the other subscribers; and wherein:
(1) the customization by the first subscriber is a first name for the first object, the customization by the first one of the other subscribers is a second name for the second object, and the customization by the second one of the other subscribers is a third name for the third object, and wherein the first name differs from each of the second name and the third name, or
(2) a first field of the first object relates to each of a first field of the second object and a first field of the third object, and the customization by the first subscriber is a first field type for a first field of the first object, the customization by the first one of the other subscribers is a second field type for the first field of the second object, and the customization by the second one of the other subscribers is a third field type for the first field of the third object, and wherein the first field type differs from each of the second field type and the third field type.

2. The method as recited in claim 1, wherein receiving the request from the first subscriber of the system to send the connection request message to the multiple receiving parties includes:

receiving from the first subscriber an indication of contacts stored in records stored in the storage area of the system associated with the first subscriber and having contact information for the receiving parties;

receiving from the first subscriber an indication of a message template for the connection request message having a request for an indication of whether the receiving parties are each the another subscriber of the system; and generating the connection request message using the message template, wherein the generated connection request message is sent to the receiving parties using the contact information for the receiving parties, wherein the response to the connection request message from each of the receiving parties includes the indication that the receiving party is the another subscriber of the system and includes an indication of permissions of the receiving party within the system, and wherein in response to determining that the receiving parties are each the another subscriber of the system based on the responses:
  identifying the records of the first subscriber within the system storing the contact information for the receiving parties; and
  automatically storing in the identified record for each of the receiving parties the indication that the receiving party is the another subscriber of the system and the indication of permissions of the receiving party within the system.

3. A computer program product comprising a non-transitory computer readable medium storing a plurality of instructions causing a computer to implement a method comprising:

providing, by a system, memory shared by multiple subscribers of the system each having an account with the system, where the memory includes logically separated storage areas dedicated to each of the accounts such that data stored in a storage area dedicated to an account of one of the subscribers of the system is inaccessible to other subscribers of the system;

receiving, by the system, a request from a first subscriber of the system to send a connection request message to multiple receiving parties;

sending, by the system, the connection request message to the receiving parties; receiving, by the system, a response to the connection request message from each of the receiving parties;

determining, by the system, that the receiving parties are each another subscriber of the system based on the responses;

for each of the receiving parties establishing, by the system, a connection between the first subscriber and the another subscriber of the system that is the receiving party;

identifying, by the system, a predefined connection template assigned to the connections by the first subscriber, the predefined connection template indicating a first object stored in the storage area of the system associated with the first subscriber that is shared via the connections; and storing, by the system, the first object shared via the connections in the storage areas of the system associated with the other subscribers of the system by:
(a) for a first one of the other subscribers of the system:
receiving, by the system, for each of a plurality of fields of the first object from the first one of the other subscribers, a mapping between the field of the first object and an existing field that is already in the storage area of the system dedicated to the account of the first one of the other subscribers; and
based on the mapping received from the first one of the other subscribers, updating, by the system, the existing fields that are in the storage area of the system dedicated to the account of the first one of the other subscribers with values of the fields of the first object; and
(b) for a second one of the other subscribers of the system:
identifying, by the system, a preconfigured setting of the second one of the other subscribers indicating that each of the fields of the first object is to be automatically mapped to an existing field that is already in the storage area of the system dedicated to the account of the second one of the other subscribers;
in response to identifying the preconfigured setting, automatically creating, by the system, a mapping between each of the fields of the first object and one of the existing fields that is already in the storage area of the system dedicated to the account of the second one of the other subscribers using at least one of a field name and a field value; and
based on the automatically created mapping, updating, by the system, the existing fields that are in the storage area of the system dedicated to the account of the second one of the other subscribers with the values of the fields of the first object;

wherein the existing fields that are already in the storage area of the system dedicated to the account of the first one of the other subscribers include fields of a second object that is already in the storage area of the system dedicated to the account of the first one of the other subscribers;

wherein the existing fields that are already in the storage area of the system dedicated to the account of the second one of the other subscribers include fields of a third object that is already in the storage area of the system dedicated to the account of the second one of the other subscribers;

wherein the first object relates to the second object that is already in the storage area of the system dedicated to the account of the first one of the other subscribers, and a customization by the first subscriber for the first object differs from a customization by the first one of the other subscribers for the second object that is already in the storage area of the system dedicated to the account of the first one of the other subscribers;

wherein the first object relates to the third object that is already in the storage area of the system dedicated to the account of the second one of the other subscribers, and the customization by the first subscriber for the first object differs from a customization by the second one of the other subscribers for the third object that is already in the storage area of the system dedicated to the account of the second one of the other subscribers; and wherein:
(1) the customization by the first subscriber is a first name for the first object, the customization by the first one of the other subscribers is a second name for the second object, and the customization by the second one of the other subscribers is a third name for the third object, and wherein the first name differs from each of the second name and the third name, or
(2) a first field of the first object relates to each of a first field of the second object and a first field of the third object, and the customization by the first subscriber is a first field type for a first field of the first object, the customization by the first one of the other subscribers is a second field type for the first field of the second object, and the customization by the second one of the other subscribers is a third field type for the first field of the third object, and wherein the first field type differs from each of the second field type and the third field type.

4. A database system, comprising
one or more processors configured for:
providing memory shared by multiple subscribers of the database system each having an account with the database system, where the memory includes logically separated storage areas dedicated to each of the accounts such that data stored in a storage area dedicated to an account of one of the subscribers of the database system is inaccessible to other subscribers of the database system;
receiving a request from a first subscriber of the database system to send a connection request message to multiple receiving parties;
sending the connection request message to the receiving parties;
receiving a response to the connection request message from each of the receiving parties;
determining that the receiving parties are each another subscriber of the database system based on the responses;
for each of the receiving parties establishing a connection between the first subscriber and the another subscriber of the database system that is the receiving party;
identifying a predefined connection template assigned to the connections by the first subscriber, the predefined connection template indicating a first object stored in the storage area of the database system associated with the first subscriber that is shared via the connections; and storing the first object shared via the connections in the storage areas of the database system associated with the other subscribers of the database system by:

(a) for a first one of the other subscribers of the database system:

receiving, for each of a plurality of fields of the first object from the first one of the other subscribers, a mapping between the field of the first object and an existing field that is already in the storage area of the database system dedicated to the account of the first one of the other subscribers; and based on the mapping received from the first one of the other subscribers, updating the existing fields that are in the storage area of the database system dedicated to the account of the first one of the other subscribers with values of the fields of the first object; and (b) for a second one of the other subscribers of the database system:

identifying a preconfigured setting of the second one of the other subscribers indicating that each of the fields of the first object is to be automatically mapped to an existing field that is already in the storage area of the database system dedicated to the account of the second one of the other subscribers;

in response to identifying the preconfigured setting, automatically creating a mapping between each of the fields of the first object and one of the existing fields that is already in the storage area of the database system dedicated to the account of the second one of the other subscribers using at least one of a field name and a field value; and based on the automatically created mapping, updating the existing fields that are in the storage area of the database system dedicated to the account of the second one of the other subscribers with the values of the fields of the first object;

wherein the existing fields that are already in the storage area of the database system dedicated to the account of the first one of the other subscribers include fields of a second object that is already in the storage area of the database system dedicated to the account of the first one of the other subscribers;

wherein the existing fields that are already in the storage area of the database system dedicated to the account of the second one of the other subscribers include fields of a third object that is already in the storage area of the database system dedicated to the account of the second one of the other subscribers;

wherein the first object relates to the second object that is already in the storage area of the database system dedicated to the account of the first one of the other subscribers, and a customization by the first subscriber for the first object differs from a customization by the first one of the other subscribers for the second object that is already in the storage area of the database system dedicated to the account of the first one of the other subscribers;

wherein the first object relates to the third object that is already in the storage area of the database system dedicated to the account of the second one of the other subscribers, and the customization by the first subscriber for the first object differs from a customization by the second one of the other subscribers for the third object that is already in the storage area of the database system dedicated to the account of the second one of the other subscribers; and wherein:

(1) the customization by the first subscriber is a first name for the first object, the customization by the first one of the other subscribers is a second name for the second object, and the customization by the second one of the other subscribers is a third name for the third object, and wherein the first name differs from each of the second name and the third name, or (2) a first field of the first object relates to each of a first field of the second object and a first field of the third object, and the customization by the first subscriber is a first field type for a first field of the first object, the customization by the first one of the other subscribers is a second field type for the first field of the second object, and the customization by the second one of the other subscribers is a third field type for the first field of the third object, and wherein the first field type differs from each of the second field type and the third field type.

* * * * *